(12) United States Patent
Takesue et al.

(10) Patent No.: US 10,187,553 B2
(45) Date of Patent: Jan. 22, 2019

(54) COLOR CONVERSION PROCESSING APPARATUS, COLOR CONVERSION PROCESSING METHOD AND STORAGE MEDIUM

(71) Applicant: CANON KABUSHIKI KAISHA, Tokyo (JP)

(72) Inventors: Naoya Takesue, Tokyo (JP); Toshiyuki Dobashi, Tokyo (JP); Tomokazu Yanai, Yokohama (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/670,505

(22) Filed: Aug. 7, 2017

(65) Prior Publication Data

US 2018/0063381 A1 Mar. 1, 2018

(30) Foreign Application Priority Data

Aug. 23, 2016 (JP) .................................. 2016-162854

(51) Int. Cl.
*H04N 1/60* (2006.01)
*G01J 3/46* (2006.01)
*G01J 3/52* (2006.01)

(52) U.S. Cl.
CPC .............. *H04N 1/603* (2013.01); *G01J 3/462* (2013.01); *G01J 3/524* (2013.01); *H04N 1/6002* (2013.01); *H04N 1/605* (2013.01); *H04N 1/6097* (2013.01)

(58) Field of Classification Search
CPC ...... H04N 1/603; H04N 1/605; H04N 1/6097; H04N 1/6002; G01J 3/462; G01J 3/524
See application file for complete search history.

(56) References Cited

U.S. PATENT DOCUMENTS 9,485,388 B2  11/2016  Kodama et al.
9,734,439 B2   8/2017  Hara et al.
(Continued)

FOREIGN PATENT DOCUMENTS

JP  2015-142250 A  8/2015

*Primary Examiner* — Christopher D Wait
(74) *Attorney, Agent, or Firm* — Carter, DeLuca, Farrell & Schmidt, LLP

(57) ABSTRACT

A color conversion processing apparatus that converts a signal value of an input image into an output value of an actual color material used in an image forming apparatus, and includes: an acquisition unit configured to acquire a printing setting for the input image; and a conversion unit configured to convert the signal value of the input image into the output value of the actual color material in accordance with the acquired printing setting, and the conversion unit performs the conversion while maintaining a relationship between the signal value of the input image and output values of a virtual color material, the number of virtual color materials is smaller than the number of actual color materials and the respective virtual color materials have respective densities corresponding to respective wavelength bands obtained by dividing a wavelength range reproduced by the actual color materials being output into a plurality of wavelength bands, the output values of the plurality of virtual color materials are determined based on the respective densities corresponding to the respective wavelength bands, and the relationship is a relationship that increases monotonically and whose secondary differential does not become negative.

12 Claims, 29 Drawing Sheets

(56) References Cited

U.S. PATENT DOCUMENTS

| | | |
|---|---|---|
| 9,749,496 B2 | 8/2017 | Fujimoto et al. |
| 2016/0004942 A1 | 1/2016 | Sumi et al. |
| 2016/0121620 A1 | 5/2016 | Yanai |
| 2017/0006186 A1 | 1/2017 | Yanai |
| 2017/0041502 A1 | 2/2017 | Fuse et al. |
| 2017/0111547 A1 | 4/2017 | Otani et al. |
| 2017/0111548 A1 | 4/2017 | Yamamoto et al. |
| 2017/0139344 A1 | 5/2017 | Takikawa et al. |
| 2017/0139363 A1 | 5/2017 | Takikawa et al. |
| 2017/0142290 A1 | 5/2017 | Fuse et al. |
| 2017/0324885 A1 | 11/2017 | Ochiai et al. |

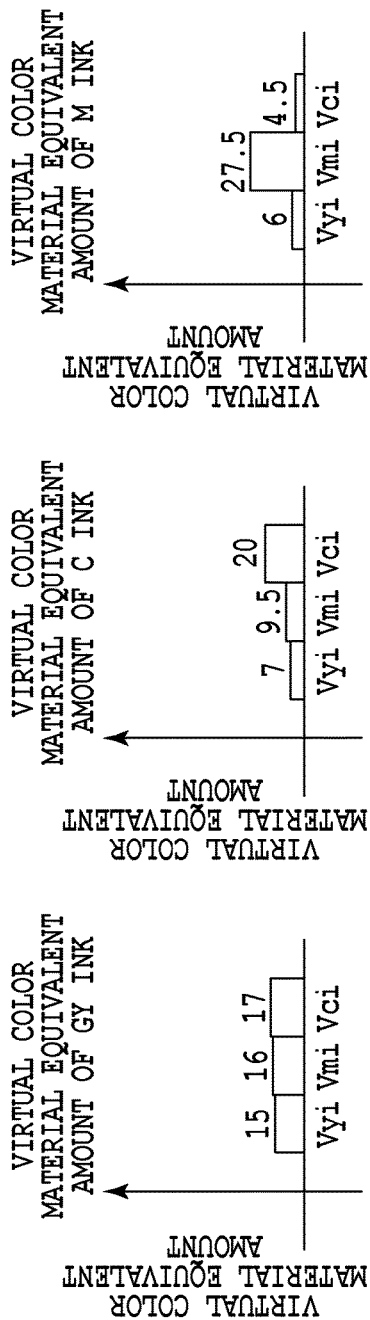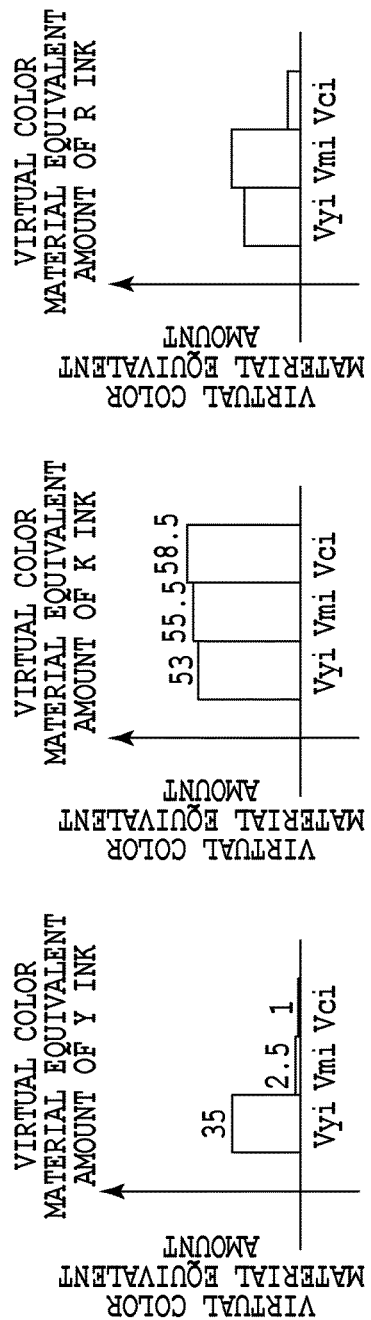

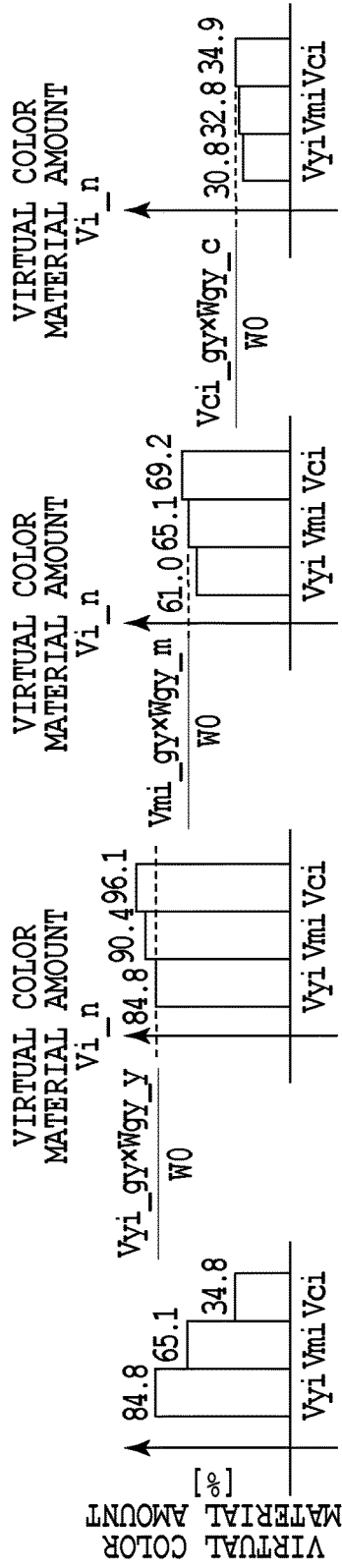
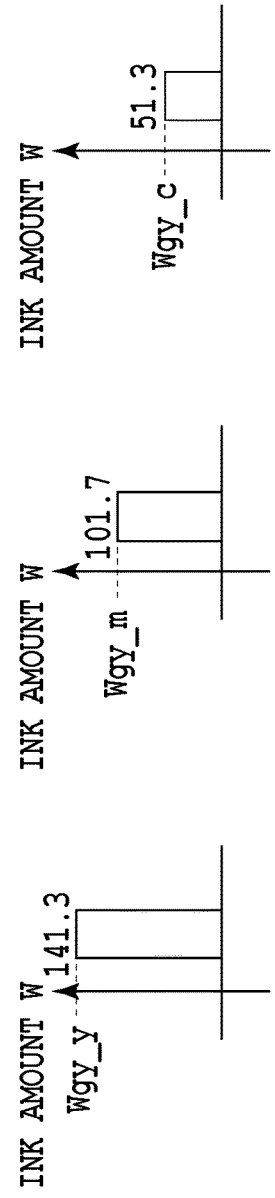

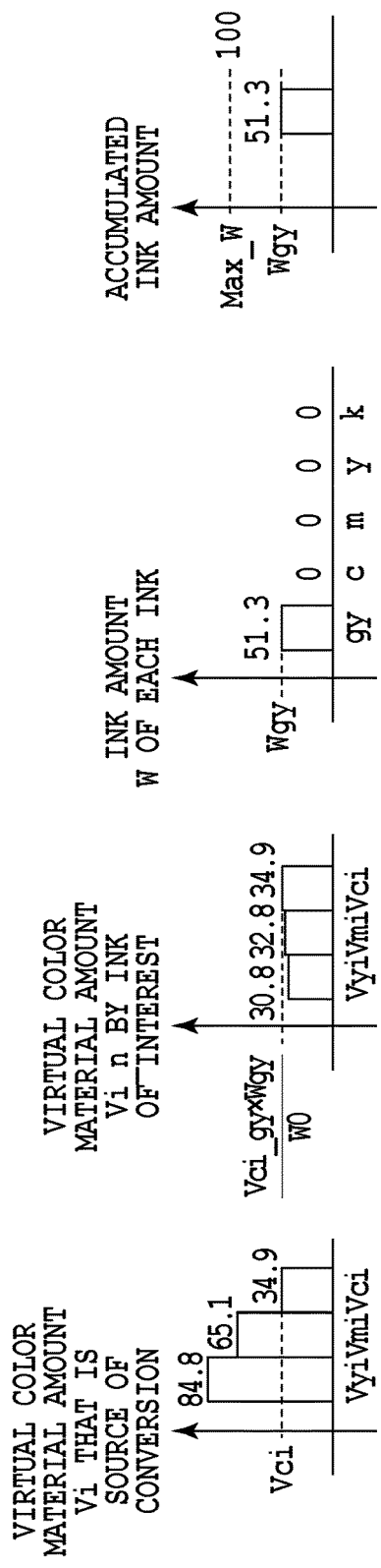

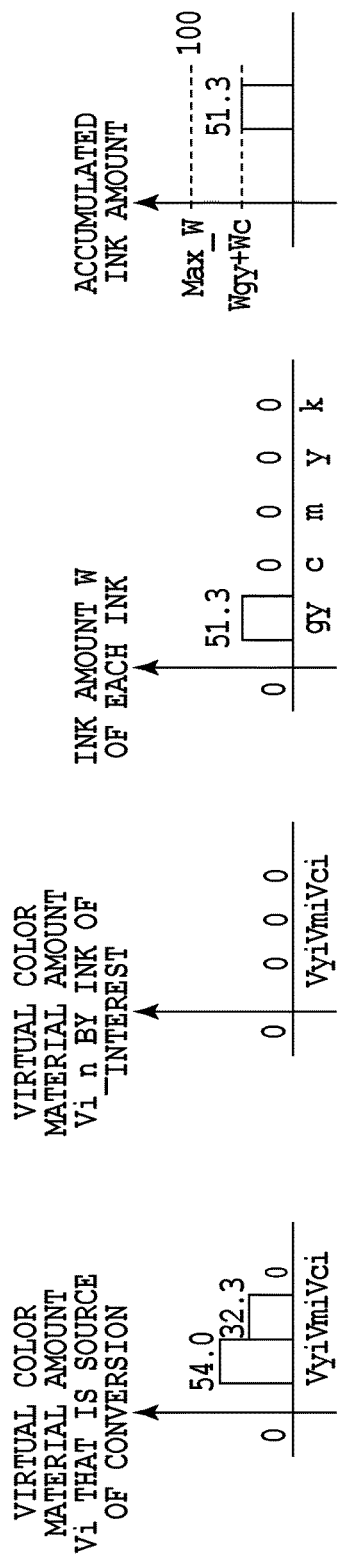

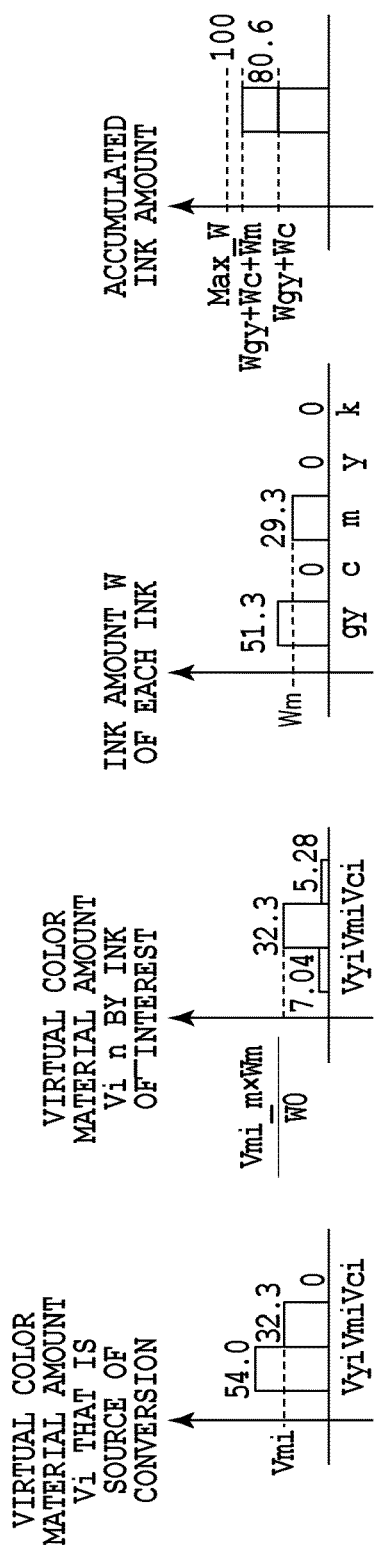

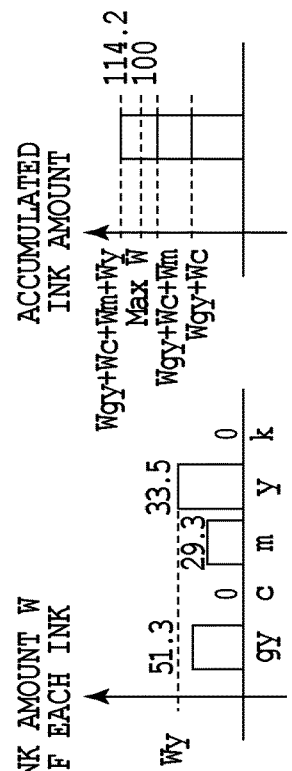
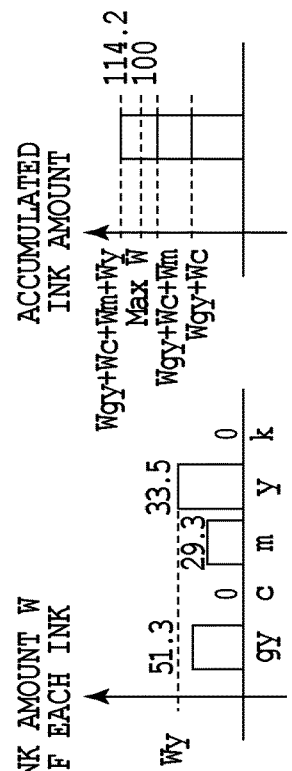
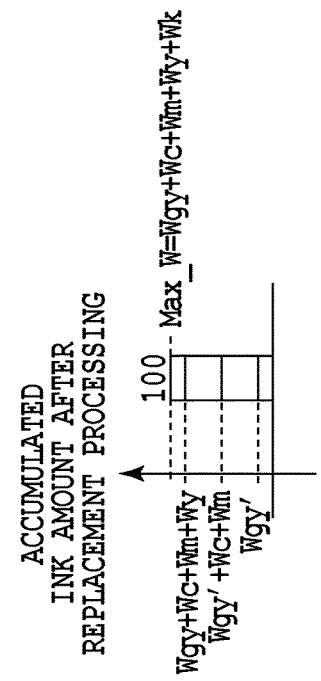
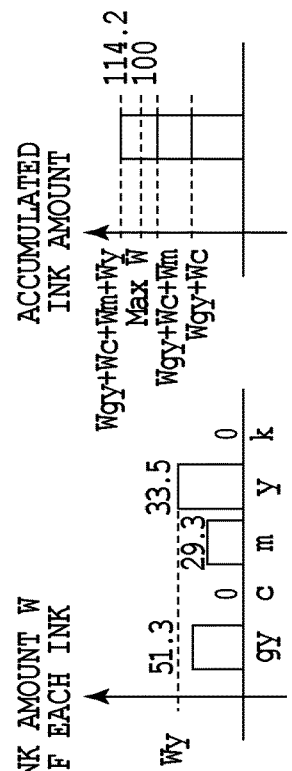
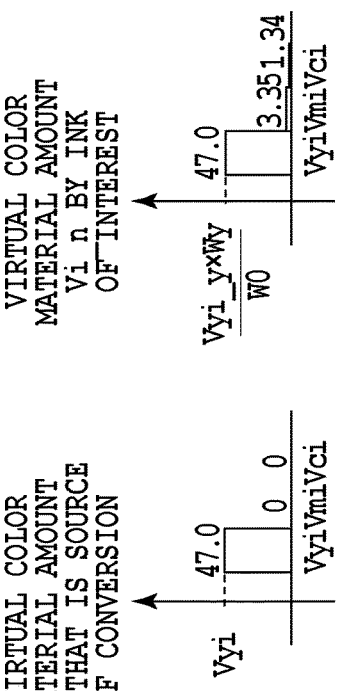
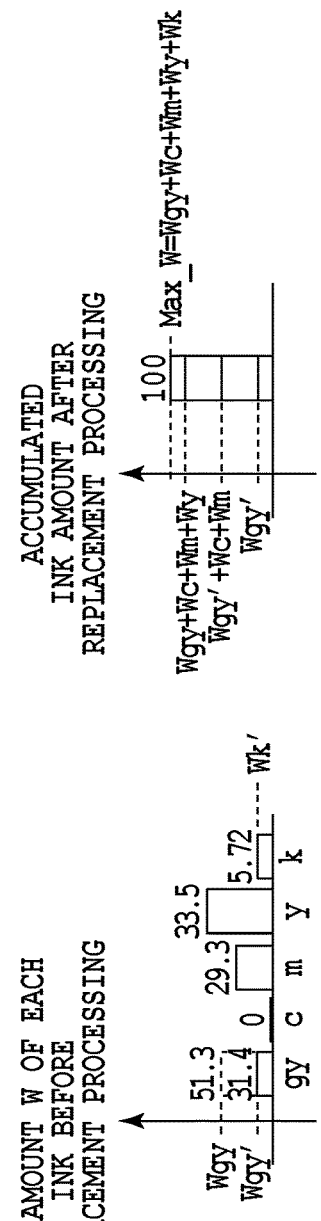

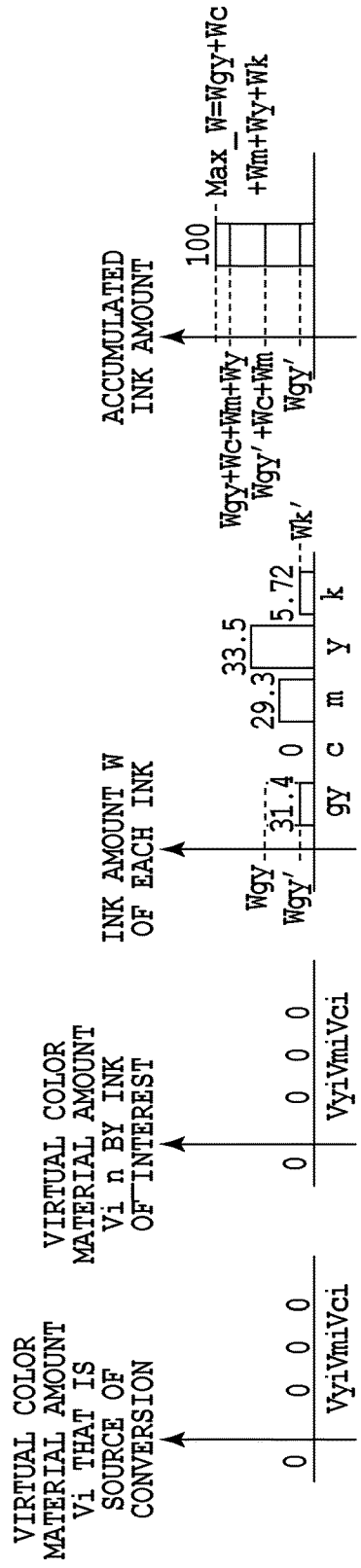

```
┌─────────────────────────────────────────────────────────────┐ ⌐2200
│ PRINTING SETTING                                         ⊠ │
│ ┌──────────────┬────────┬───────────┬──────────────┬──────┐│
│ │ PAGE SETTING │ FINISH │SHEET FEED │PRINTING GRADE│DETAILED SETTING│
│ ☑ MAKE DETAILED SETTINGS EFFECTIVE                         │
│  ╲2201                                                     │
│    · PRINTING GRADE ⁓2210                                  │
│                                                            │
│      HIGH            HIGH    HIGHEST                       │
│      SPEED  STANDARD GRADE   GRADE      ⌐2211    ⌐2212    │
│       (1)     (2)     (3)     (4)                          │
│      ──┼──────┼───────┼───────┼──       GRADE: │ 2.2 │▲▼   │
│               △                                            │
│  ──────────────────────────────────────────────────────── │
│    ·SHEET SETTING ⁓2220        2221                        │
│       ○ STANDARD SHEET      ● CUSTOMIZE SHEET              │
│                                 ⌐2223         ⌐2222        │
│       ┌──────────────┐    ┌──────────────┐ ┌──────────┐   │
│       │ GLOSSY SHEET ☑│   │ SELECT SHEET │ │ CREATE   │   │
│       └──────────────┘    └──────────────┘ │CHARACTERISTICS│
│                                            └──────────┘   │
│  ──────────────────────────────────────────────────────── │
│    ·INK REDUCTION ETC ⁓2230                        ⌐2232   │
│          0              100                                │
│      min ├───────────────┤ max   REDUCTION AMOUNT: │ 12 │▲▼│
│           △                  ╲2231                         │
│    2233⁓☑ PERMIT CHANGE OF COLOR                          │
│    2234⁓☑ INCREASE NUMBER OF SHEETS TO BE PRINTED         │
│                                                    ⌐2236  │
│       2235⁓☑ SPECIFY NUMBER OF SHEETS TO BE PRINTED │ 5 │▲▼│
│                                                            │
│    2237⁓☑ IMPROVE EDGE SHARPNESS                          │
│                                                            │
│                              2202⁓┌────┐  ┌────────┐      │
│                                   │ OK │  │ CANCEL │      │
│                                   └────┘  └────────┘      │
└─────────────────────────────────────────────────────────────┘
```

FIG.22

COLOR CONVERSION PROCESSING APPARATUS, COLOR CONVERSION PROCESSING METHOD AND STORAGE MEDIUM

BACKGROUND OF THE INVENTION

Field of the Invention

The present invention relates to image processing to convert an image signal into a signal corresponding to a plurality of color material components that a printer handles.

Description of the Related Art

A printer, represented by an ink jet printer or an electrophotographic printer, generates print data by receiving an image signal (normally, RGB color signal) as an input and converting the image signal into the amount of color material (e.g., ink of CMYK and toner) used in the printer. Depending on the setting of the color material amount of the printer, the image quality, such as gradation properties, color reproduction accuracy, and granularity, changes, and therefore, the conversion processing from an image signal into a color material amount is important.

This conversion processing is called color conversion processing and at present, the mainstream is the method that uses a three-dimensional LUT (Lookup Table). The three-dimensional LUT holds the color material amount of a printer corresponding to three-dimensional data of RGB, which is an input signal. In general, the three-dimensional LUT does not hold output values (color material amount) for all input values (RGB value), but holds only output values on grid points in the number of about 16 to 256 for each axis of RGB for the purpose of saving the storage capacity of an apparatus. For example, in the case where 16 grid points are arranged by dividing each axis into 15 portions, output values are held on the grid points in the number of 16×16× 16=4,096. By using this three-dimensional LUT and the interpolation operation represented by tetrahedral interpolation, it is made possible to find the color material amount corresponding to an arbitrary RGB input value. In the interpolation operation, the color material amount is calculated by the product-sum operation of the color material amount information stored at adjacent grid points including the RGB value desired to be found and the coefficient (weighting) in accordance with the RGB value desired to be found and the information on the distance between the adjacent grid points. The results of the calculation of the color material amount by the interpolation operation are affected by the color material amount information stored at the grid point, and therefore, in order to improve the image quality, such as gradation properties, color reproduction accuracy, and granularity, the setting of the color material amount stored at the grid point becomes important. Regarding this point, Japanese Patent Laid-Open No. 2015-142250 has disclosed a technique to set a target color for each of a plurality of thinned grid points and to calculate the color material amount (ink amount) that implements each target color based on a color prediction model. In this technique, for the color material whose deterioration of gradation is conspicuous and whose optical density is relatively high, the color material amount is determined with priority so that there is no inflection point between grid points, and thereby, a three-dimensional LUT whose gradation properties and granularity in the shadow area are favorable is created.

However, in the technique described in Japanese Patent Laid-Open No. 2015-142250, for the color material whose optical density is relatively low, the color material amount is determined independently for each grid point based on the color prediction model. At this time, it is necessary to determine the color material amounts in the number corresponding to the number of color materials (e.g. four to twelve) used in the printer. In general, the level of difficulty of color prediction for a large number of color materials is high and an error from the actual color is produced. In the case where this error occurs in a fixed direction (the sign of the color difference is the same between grid points), the continuity of gradation is maintained, but in the case where this error occurs in different directions (the sign of the color difference is different between grid points), on a condition that the color material amount is calculated by the above-described interpolation calculation, there is a case where discontinuity of gradation occurs in an area crossing over a grid point. As a result of this, with the technique of Japanese Patent Laid-Open No. 2015-142250, there is a case where sufficient gradation properties are not obtained in the halftone or highlight area compared to the shadow area.

Consequently, an object of the present invention is to provide a color conversion processing apparatus capable of obtaining favorable gradation properties in the entire color space from the shadow area to the highlight area.

SUMMARY OF THE INVENTION

The color conversion processing apparatus according to the present invention is a color conversion processing apparatus that converts a signal value of an input image into an output value of an actual color material used in an image forming apparatus, and includes: an acquisition unit configured to acquire a printing setting for the input image; and a conversion unit configured to convert the signal value of the input image into the output value of the actual color material in accordance with the acquired printing setting, and the conversion unit performs the conversion while maintaining a relationship between the signal value of the input image and output values of a virtual color material, the number of virtual color materials is smaller than the number of actual color materials and the respective virtual color materials have respective densities corresponding to respective wavelength bands obtained by dividing a wavelength range reproduced by the actual color materials being output into a plurality of wavelength bands, the output values of the plurality of virtual color materials are determined based on the respective densities corresponding to the respective wavelength bands, and the relationship is a relationship that increases monotonically and whose secondary differential does not become negative.

Further features of the present invention will become apparent from the following description of exemplary embodiments with reference to the attached drawings.

BRIEF DESCRIPTION OF THE DRAWINGS

FIG. 11A to FIG. 11F are each a diagram showing an example of each ink in the case where each ink is represented by equivalent virtual color materials;

FIG. 12A to FIG. 12D-b are diagrams showing a determination procedure of an output value of a gray ink;

FIG. 13A to FIG. 13D are diagrams explaining a change in loop processing at S905 to S910;

FIG. 14A to FIG. 14D are diagrams explaining a change in the loop processing at S905 to S910;

FIG. 15A to FIG. 15D are diagrams explaining a change in the loop processing at S905 to S910;

FIG. 16A to FIG. 16D-b are diagrams explaining a change in the loop processing at S905 to S910;

FIG. 17A to FIG. 17D are diagrams explaining a change in the loop processing at S905 to S910;

FIG. 22 is a diagram showing an example of a printing setting screen according to the second embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, in order to enable color conversion in which discontinuity of gradation is less, in place of color materials (actual color materials) actually used in a printer, output values of virtual color materials for an input image signal value are derived first, whose each absorption wavelength band does not overlap another in principle. Specifically, the color material amount of the virtual color material is derived so that the relationship between the input image signal value and the output value of the virtual color material is one that increases monotonically and causes no inflection point to occur or whose number of inflection points is as small as possible (whose secondary differential does not become negative). After this, while the above-described relationship is maintained between the input image signal and the virtual color material amount, the conversion into the output value of the actual color material is performed. In the following, detailed explanation is given.

In the following explanation, as an image forming apparatus, an ink jet printer is supposed and explanation is given by taking an aspect as an example in which for an input image signal, the amount of ink used in the printer is derived. However, the present invention is not limited to an ink jet printer and it is also possible to apply the present invention to other printing schemes, such as a thermal dye-sublimation printer, a laser printer, and a UV curable ink jet printer.

(Configuration Example of Printing System)

Figure 1:
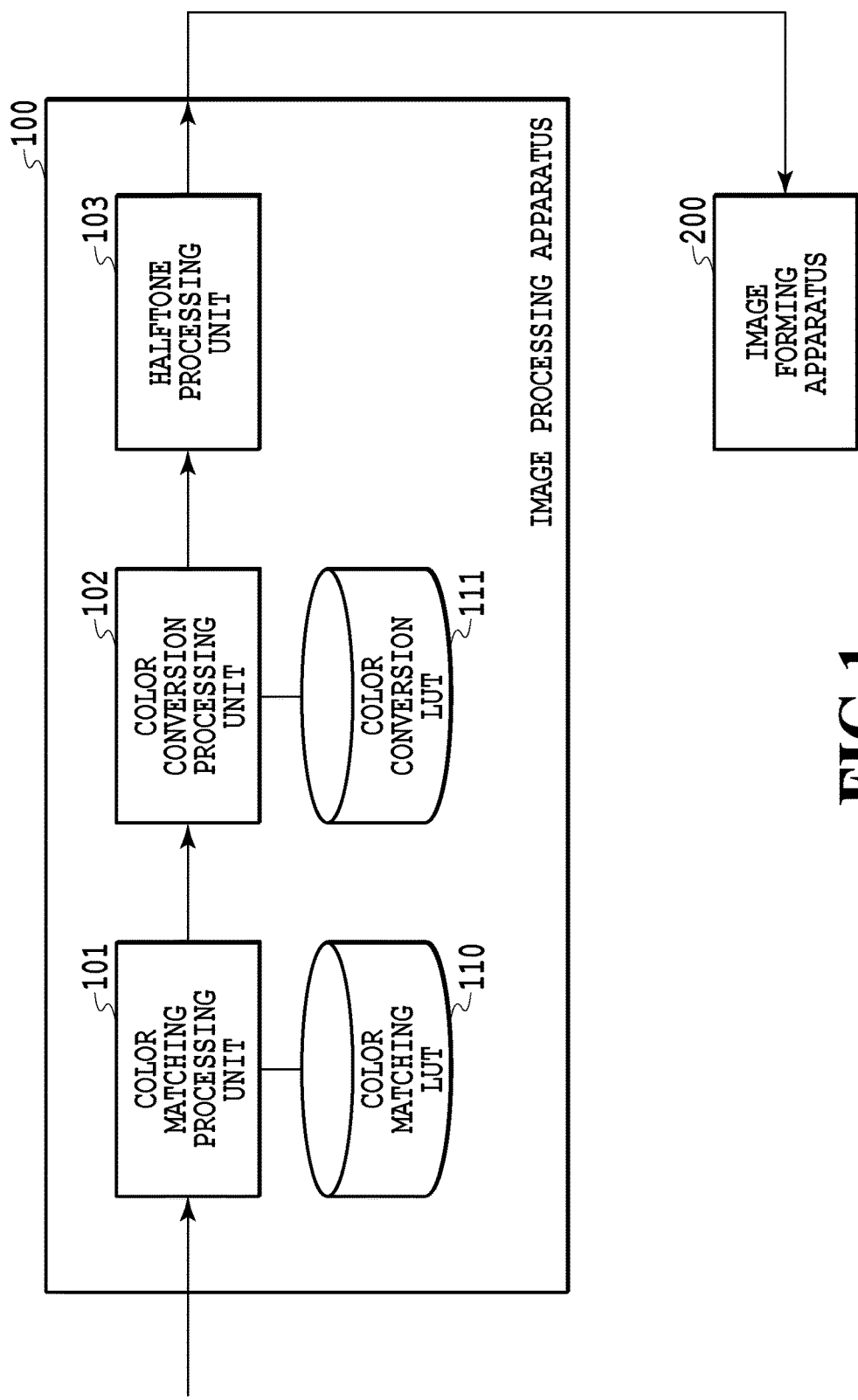
FIG. 1 is a block diagram showing an example of a configuration of a printing system.

FIG. 1 is a block diagram showing an example of a configuration of a printing system according to the present embodiment. The printing system in FIG. 1 includes, for example, an image processing apparatus 100, such as a general personal computer, and an image forming apparatus 200, such as the ink jet printer described above, and both are connected by a printer interface or a circuit. The image processing apparatus 100 includes a color matching processing unit 101, a color conversion processing unit 102, and a halftone processing unit 103 and each unit is implemented by a printer driver installed in the image processing apparatus 100.

In the image processing apparatus 100, printing-target image data is processed first in the color matching processing unit 101. This image data is, for example, 8-bit RGB color image data. The color matching processing unit 101 performs color matching processing for the input RGB image data and corrects the color of the RGB image. By this color matching processing, even in the case where an image forming apparatus or a printing medium having various color reproduction characteristics is used, it is possible to obtain systematic color reproduction. At the time of color matching processing, a three-dimensional color matching lookup table (LUT) 110 stored in the HDD and the like, not shown schematically, is referred to. In the color matching LUT 110, for example, RGB values are described only on 17×17×17 grid points and a value between grid points is derived by linear interpolation and the like. It may also be possible to implement the color matching processing by holding a matrix for color matching in place of an LUT and by performing matrix conversion for the input RGB value.

The RGB image data for which the color matching processing has been performed is sent to the color conversion processing unit 102.

Figure 2:
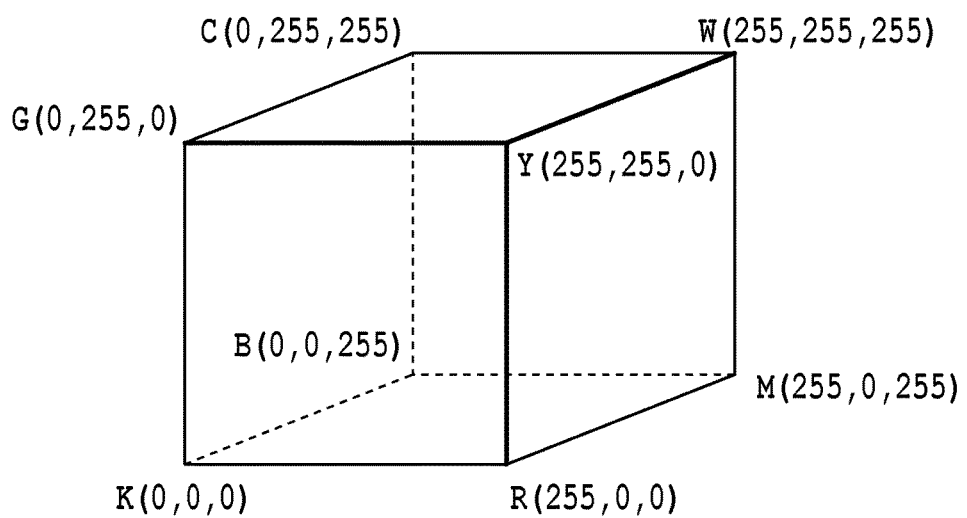
FIG. 2 is a diagram schematically showing a color conversion LUT.

The color conversion processing unit 102 generates each image (ink value image) corresponding to each ink used in the image forming apparatus 200 from the RGB image data for which the color matching processing has been performed. In this color conversion processing, a color conversion LUT 111 stored in the HDD and the like, not shown schematically, is referred to and the RGB value, which is an input image signal, is converted into an output value of ink. FIG. 2 is a diagram of an RGB cube (color cube) schematically representing a color conversion LUT. In the color conversion LUT, for each combination of input RGB values, an output value (ink amount) of each ink used in the image forming apparatus 200 is defined. Each of vertexes (0, 0, 0), (255, 0, 0), (0, 255, 0), (0, 0, 255), (0, 255, 255), (255, 0, 255), (255, 255, 0), and (255, 255, 255) of the color cube in FIG. 2 is a point corresponding to an input image signal. Each vertex (primary point) corresponds to a color of black (K), red (R), green (G), blue (B), cyan (C), magenta (M), yellow (Y), and white (W). Characteristics and a creation method of a color conversion LUT in the present embodiment will be described later.

The halftone processing unit 103 converts the ink value image of each color obtained by the color conversion processing unit 102 into a binary image (or image whose number of values is two or more and whose number of tone levels is smaller than the number of input tone levels) that can be handled by the image forming apparatus 200. As the halftone processing method, mention is made of the publicly known dither matrix method and error diffusion method. The binary image data generated by the halftone processing unit 103 is output to the image forming apparatus 200 and in the image forming apparatus 200, an image in accordance with the binary image data is formed on a printing medium, such as paper.

(Concept of Color Conversion Processing of the Present Embodiment)

As described above, in the color conversion processing unit 102, an input image signal value (here, RGB value) is converted into a value (ink value) indicating an ejection amount of ink, which is an actual color material. At this time, in the case where the ink values are determined so as to change smoothly for the consecutive input RGB values, the gradation of an image formed by the image forming apparatus 200 also becomes smooth. The degree of smoothness of the ink value is derived by a feature amount based on a difference in, for example, the primary differential or the secondary differential. On the other hand, the color matching processing is, as described previously, processing to obtain systematic color reproduction for a printer and a printing medium having various color reproduction characteristics. Consequently, the color matching LUT 110 to be used is determined so that the input RGB value and the color of an image to be formed match with each other. At this time, in the case where the color conversion LUT 111 is designed so that smooth ink values are obtained in the entire color area, it is made possible to obtain a printout whose color reproduction is guaranteed and whose gradation is smooth only by matching the input RGB value with the color of an image to be formed by the color matching LUT 110.

Based on the concept such as this, the present embodiment proposes a color conversion method capable of guaranteeing smoothness of the output gradation for consecutive input RGB values. Specifically, on the premise that the color matching processing unit 101 is in charge of the processing to match the input RGB value with the color of an image to be formed, the color conversion method is designed so as to derive the ink value for the input RGB value. Because of this, the color of an image to be formed in accordance with the color conversion method according to the present embodiment does not necessarily match with the color indicated by the input image signal. The ink values derived in accordance with the color conversion method in the present embodiment are associated with discrete input image signal values obtained by appropriately thinning those in the range of 16 to 256 for each of the RGB axes. Then, the ink values are held as the color conversion LUT 111 and referred to in the color conversion processing in the color conversion processing unit 102.

(Color Conversion Processing Procedure)

Figure 3:
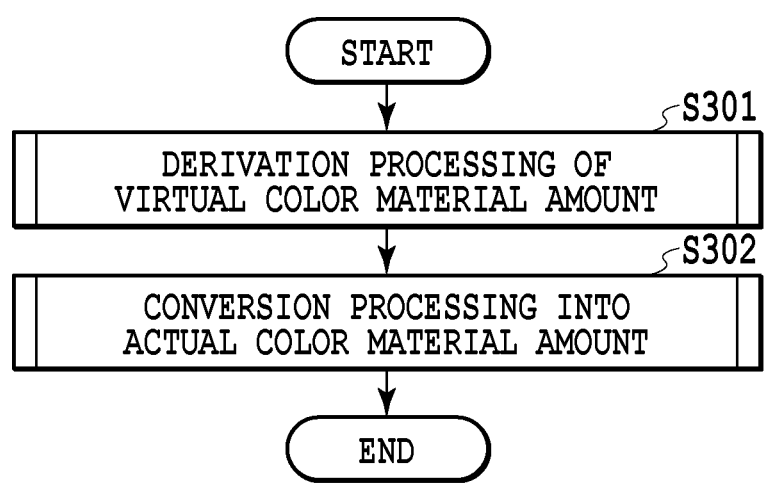
FIG. 3 is a flowchart showing a flow of color conversion processing according to the present embodiment.

FIG. 3 is a flowchart showing a flow of color conversion processing according to the present embodiment. In order to implement smooth output gradation by the color conversion processing, it is necessary for the output image density to change smoothly for the input image signal. That is, in the case where it is possible to implement color conversion processing by which the output image density changes smoothly for the input image signal, it is possible to attain smooth output gradation. However, the larger the number of inks used in a printer, the more difficult it becomes to derive the ink amount that causes the image density to change smoothly. Consequently in the present embodiment, virtual color materials in the number smaller than the number of inks used in the image forming apparatus 200 are defined and the virtual color material amount is found so that the characteristics of the output value of the virtual color material (virtual color material amount) for the input RGB value change smoothly in the entire color area (S301). As described above, it is desirable that the absorption wavelength bands corresponding to the respective color materials do not overlap one another. Then, the virtual color material amount that is found is converted into the ink value as the actual color material amount based on a conversion expression or a conversion table having substantially linear characteristics (S302). For example, the case is considered where the input RGB value is converted into the ink amount of cyan (c), magenta (m), yellow (y), black (k), light cyan (lc), light magenta (lm), gray (gy), and red (r). In this case, for a three-dimensional consecutive input signal (R, G, B), an eight-dimensional ink amount (Wc, Wm, Wy, Wk, Wgy, Wlc, Wlm, Wr) is derived in accordance with the procedure shown in FIG. 3.

(Virtual Color Material Amount)

Prior to detailed explanation of each of the above-described steps, the virtual color material amount is explained. In the present embodiment, it is assumed that the virtual color materials are inks of three colors, i.e., yellow, magenta, and cyan, which are the three primary colors of the subtractive color mixture. Here, a spectral reflectance Ref ($\lambda$) is divided into n wavelength blocks and the values obtained by averaging the spectral reflectance within each wavelength block are defined as block reflectances Ref1, Ref2, ..., Refn. Further, values D1, D2, ..., Dn obtained by converting the block reflectances Ref1, Ref2, ..., Refn by expression (1) below are defined as block densities.

$$Dx = -\log 10(\text{Ref}x) \quad \text{expression (1)}$$

Figure 4A:
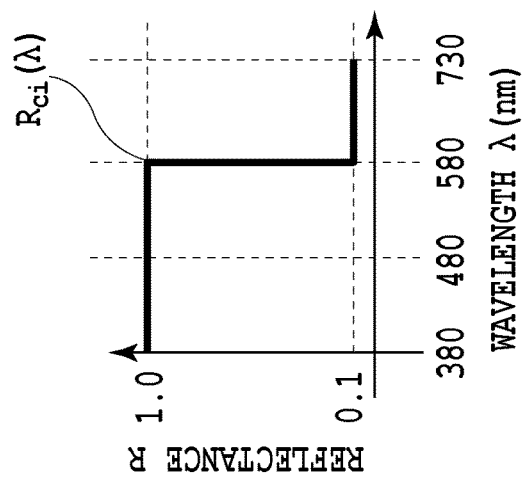
FIG. 4A to FIG. 4C are each a diagram showing a spectral reflectance of a virtual color material.
Figure 4B:
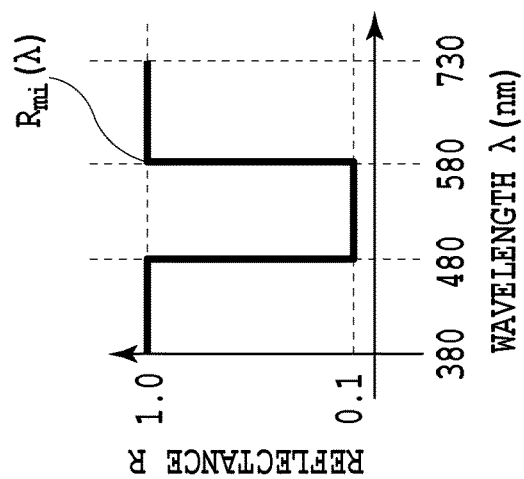
Figure 4C:
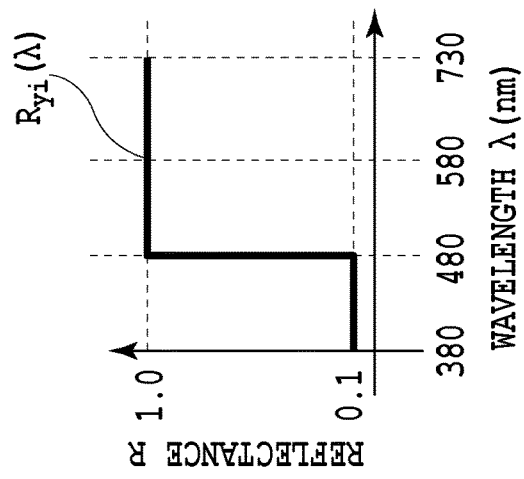

In expression (1) described above, x is a subscript indicating 1 to n. In the present embodiment, the spectral reflectance Ref ($\lambda$) is divided into three wavelength blocks corresponding to the wavelength bands that the above-described three color inks mainly absorb. At this time, the block density corresponding to the wavelength band (380 to 480 nm) that the yellow ink mainly absorbs is taken to be Dy. Similarly, the block density corresponding to the wavelength band (480 to 580 nm) that the magenta ink mainly absorbs is taken to be Dm and the block density corresponding to the wavelength band (580 to 730 nm) that the cyan ink mainly absorbs is taken to be Dc. Further, in the present embodiment, virtual color materials having virtual spectral reflectances Ryi ($\lambda$), Rmi ($\lambda$), and Rci ($\lambda$) corresponding to the block densities Dy, Dm, and Dc, respectively are defined as yi, mi, and ci. FIG. 4A to FIG. 4C are each a graph representing the spectral reflectance of the virtual color material. FIG. 4A shows that the virtual color material yi absorbs only the wavelength band (380 to 480 nm) that the yellow ink mainly absorbs and reflects 100% of the light of wavelengths outside the wavelength band. Similarly, FIG. 4B shows that the virtual color material mi absorbs only the wavelength band (480 to 580 nm) that the magenta ink mainly absorbs and FIG. 4C shows that the virtual color material ci absorbs only the wavelength band (580 to 730 nm) that the cyan ink mainly absorbs.

Figure 5C:
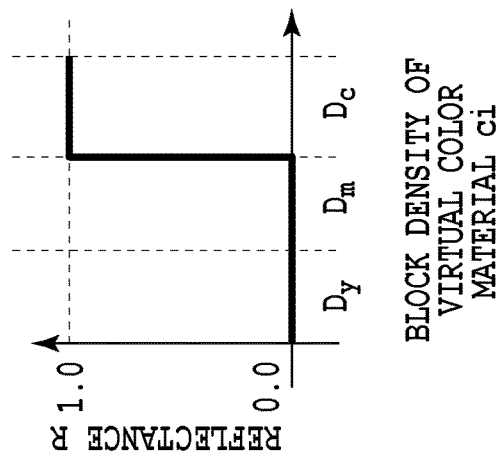
FIG. 5A to FIG. 5C are each a diagram showing a block density of a virtual color material.
Figure 5B:
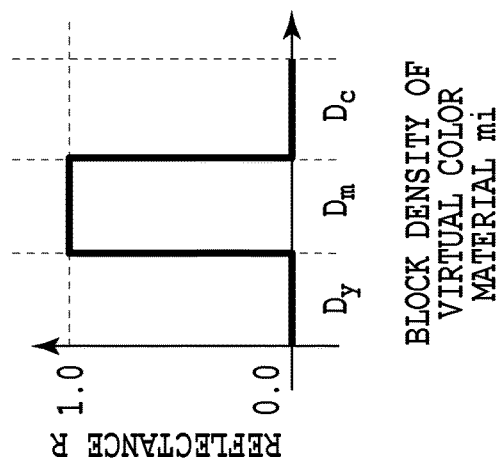
Figure 5A:
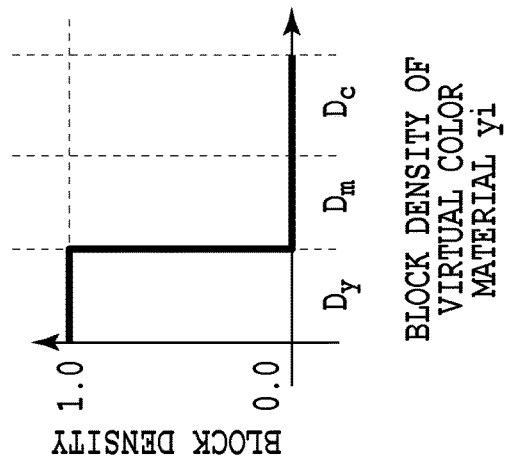

As described above, the block density of the virtual color material is found by expression (1) described above. For example, it is assumed that the reflectance of the wavelength band that each virtual color material mainly absorbs is 10%. At this time, the block density of the virtual color material yi is Dy=1.0, Dm=0.0, and Dc=0.0 (see FIG. 5A). Similarly, the block density of the virtual color material mi is Dy=0.0, Dm=1.0, and Dc=0.0 and the block density of the virtual color material ci is Dy=0, Dm=0.0, and Dc=1.0 (see FIG. 5B and FIG. 5C).

Here, it is already known that the thickness (amount) of the color material is proportional to the optical density as Lambert's law in the range where light scattering can be ignored. In the case where it is assumed that this law holds at all times for the virtual color materials yi, mi, and ci, on a recording medium, then, each block density of yi, mi, and ci, is proportional to the color material amount per unit area on the printing medium. That is, it is possible to perform linear conversion mutually between the arbitrary block densities Dy, Dm, and Dc and virtual color material amounts Vyi [%], Vmi [%], and Vci [%] in accordance with expression (2-1) to expression (2-3) below.

$$Vyi = \alpha\_y \times Dy \times 100 \quad \text{expression (2-1)}$$

$$Vmi = \alpha\_m \times Dm \times 100 \quad \text{expression (2-2)}$$

$$Vci = \alpha\_c \times Dc \times 100 \quad \text{expression (2-3)}$$

In expression (2-1) described above, $\alpha\_y$ is a constant of proportion in relation to the yellow density of the virtual color material yi and means that the larger the value thereof, the higher the yellow density per unit amount is. For example, in the case where the block density in a predetermined amount of material to be applied (hereinafter, applied material amount) V0 of the virtual color material yi is taken to be Dy0, it is possible to find the constant of proportion $\alpha\_y$ by $(100/V0) \times Dy0$. Similarly, in expression (2-2) described above, $\alpha\_m$ is a constant of proportion in relation to the magenta density of the virtual color material mi and in expression (2-3) described above, $\alpha\_c$ is a constant of proportion in relation to the cyan density of the virtual color material ci.

According to the hitherto given explanation, the arbitrary spectral reflectance Ref ($\lambda$) can be converted into the block densities Dy, Dm, and Dc by expression (1) described above after finding the block reflectance. Further, by expression (2-1) to expression (2-3) described above, it is possible to uniquely convert the block density into each of the virtual color material amounts Vyi, Vmi, and Vci. Then, in the present embodiment, the output value of each ink, which is the actual color material, is derived so that the above-described virtual color material amounts Vyi, Vmi, and Vci change smoothly for the input image signal (here, three channels of RGB). The spectral reflectance of the virtual color material is not limited to the above-described example and for example, it may also be possible to define the spectral reflectance of the virtual color material by narrowing the wavelength band in which the virtual color material has a density so that the virtual color material has a density only in part of the wavelength band (e.g., the virtual color material yi absorbs only wavelengths of 400 to 460 nm). Further, on the contrary, it may also be possible to define the spectral reflectance of the virtual color material so that two or more virtual materials have a density for the same wavelengths by widening the wavelength band. As described above, it is premised that the virtual color materials do not overlap in the absorption wavelength band. The reason is that in the case where there is an overlap, the specific wavelength area is evaluated twice, and therefore, there is a possibility that the color material amount becomes too excessive. Further, in the case where there is no overlap, conversion (calculation) between the input RGB value and the virtual color material amount and between the virtual color material amount and the actual color material amount is made easy. However, in the case where complicatedness of calculation is allowed and the light absorption characteristics of the normal distribution with the center of each wavelength band as a peak are possessed in place of the rectangular light absorption characteristics for the wavelength, on a condition that the degree of overlap is such a degree in which its skirt portions overlap slightly, the possibility that the color material amount is evaluated to be too excessive is slight. Consequently, in the wavelength band corresponding to each virtual color material, the existence of such an overlap in terms of that as restricted as above may be allowed.

Further, in the example described above, the reflectance Ref of each virtual color material is defined as 10% in the wavelength band that the virtual color material mainly absorbs, and as 100% in the other wavelength bands and the block density is set to 0.0 or 1.0. However, the reflectance and the block density of the virtual color material are not limited to the above and other values may be used. Of course, it may also be possible to apply a different reflectance to each of the virtual color materials yi, mi, and ci.

Further, the number of virtual color materials is not limited to three and may be three or more and less than the number of inks used in the image forming apparatus 200. In the case where the image forming apparatus 200 includes five color inks as in the present embodiment, for example, it may also be possible to define block densities that equally divide the wavelength range (e.g., 380 to 730 nm) reproduced by the ink, which is the actual color material, into four ranges and to define a virtual color material corresponding to each of the four ranges. Further, the width of the wavelength band may be a width of a wavelength band narrower than 380 to 730 nm or may be a width of a wider wavelength band including another wavelength band.

(Derivation Processing of Virtual Color Material Amount)

Figure 6:
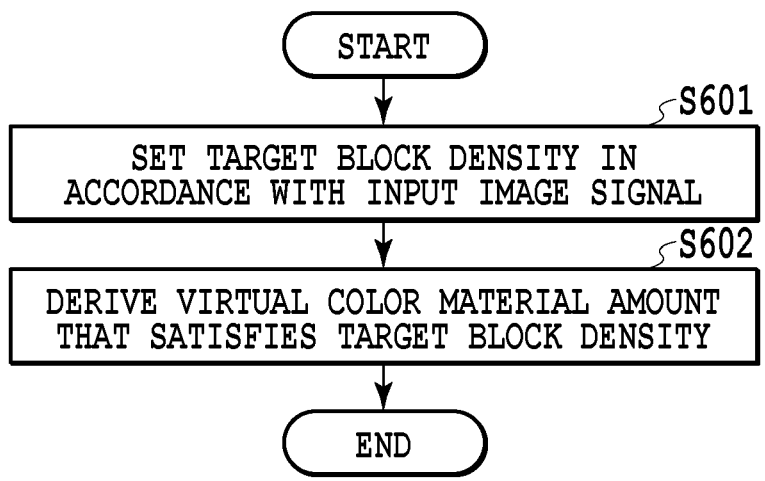
FIG. 6 is a flowchart showing details of virtual color material amount derivation processing according to a first embodiment.

Next, the virtual color material amount derivation processing at step 301 described above is explained. It is also possible to refer to this processing in different words as processing to separate an input image signal into the virtual color material amounts. FIG. 6 is a flowchart showing details of the virtual color material amount derivation processing according to the present embodiment.

First, at step 601, block densities T_Dy, T_Dm, and T_Dc that are targets for an input image signal are set, respectively. For example, it is assumed that an input image signal is input as an RGB value on an sRGB space. In this case, it is possible to find the target block densities T_Dy, T_Dm, and T_Dc by expressions (3-1) to (3-3) below.

$$T\_Dy(B) = -\log\{(B/B\_max)^{2.2}\} \text{ here, } B \neq 0 \quad \text{expression (3-1)}$$

$$T\_Dm(G) = -\log\{(G/G\_max)^{2.2}\} \text{ here, } G \neq 0 \quad \text{expression (3-2)}$$

$$T\_Dc(R) = -\log\{(R/R\_max)^{2.2}\} \text{ here, } R \neq 0 \quad \text{expression (3-3)}$$

Figure 7:
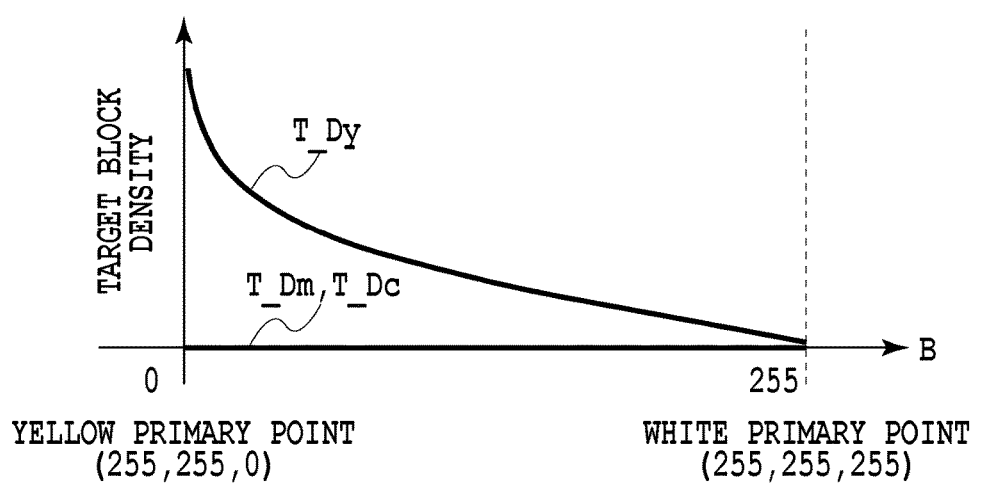
FIG. 7 is a diagram showing an example of a target block density on a W-Y line.

In expression (3-1) to expression (3-3) described above, B_max, G_max, and R_max are the maximum values that the input RGB value can take, respectively. Here, in the case where B=0, it is sufficient to set, for example, T_Dy (0)=T_Dy (1)+(T_Dy (1)−T_Dy (2))=−2 log {(1/B_max) ^2.2}+log {(2/B_max) ^2.2}. Similarly, in the case where G=0, it is sufficient to set T_Dm=−2 log {(1/G_max) ^2.2}+log {(2/G_max) ^2.2} and in the case where R=0, it is sufficient to set T_Dc=−2 log {(1/R_max) ^2.2}+log {(2/R_max) ^2.2}. It may also be possible to set those obtained by multiplying T_Dy, T_Dm, and T_Dc found by each expression described above by respective constants as the target block densities. FIG. 7 shows an example of the target block densities T_Dy, T_Dm, and T_Dc on a W-Y line that connects the white primary point and the yellow primary point.

Figure 8:
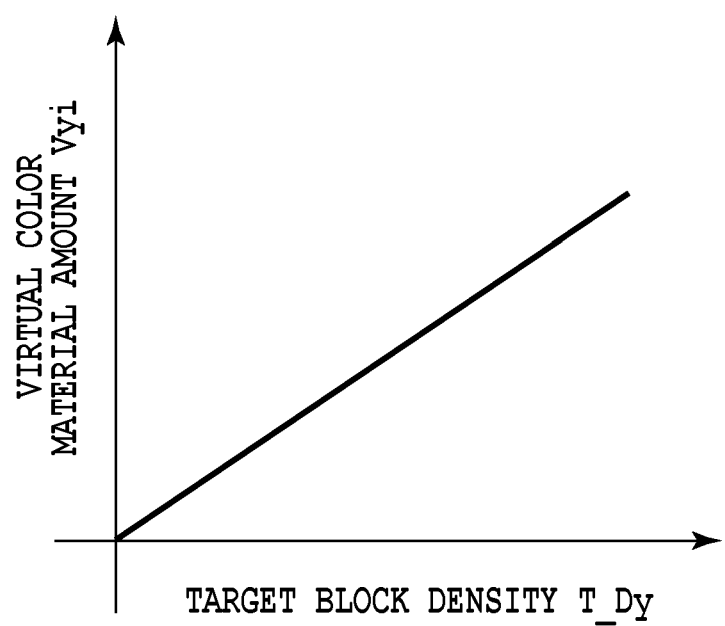
FIG. 8 is a diagram showing an example of a virtual color material amount that implements a target block density.

Next, at step 602, the virtual color material amounts that implement the target block densities T_Dy, T_Dm, and T_Dc set at step 601 are derived. As described previously, in the case where it is assumed that Lambert's law holds at all times for the virtual color materials yi, mi, and ci, by expression (2-1) to expression (2-3) described previously, it is possible to linearly convert the block densities Dy, Dm, and Dc into the amounts Vyi, Vmi, and Vci of the virtual color materials yi, mi, and ci, respectively. FIG. 8 is a graph representing a relationship between the target block density T_Dy and the virtual color material amount Vyi that implements T_Dy in the case of following the above, and it is known that there is a linear relationship between the target block density T_Dy and the virtual color material amount Vyi. The above is the contents of the virtual color material amount derivation processing.

(Conversion Processing into Actual Color Material Amount)

Following the above, the conversion processing from the virtual color material amount into the actual color material amount at step 302 described above is explained. In the present embodiment, in the conversion from the virtual color material amount into the actual color material amount, the actual color material amounts are determined so that at least one of the virtual color material amounts Vyi, Vmi, and Vci does not exceed the virtual color material amount that is the source of conversion. At this time, by performing conversion from the virtual color material amount into the actual color material amount using a linear combination model, the virtual color material amount is converted into the actual color material amount with the smoothness of the virtual color material amount being kept.

Figure 9:
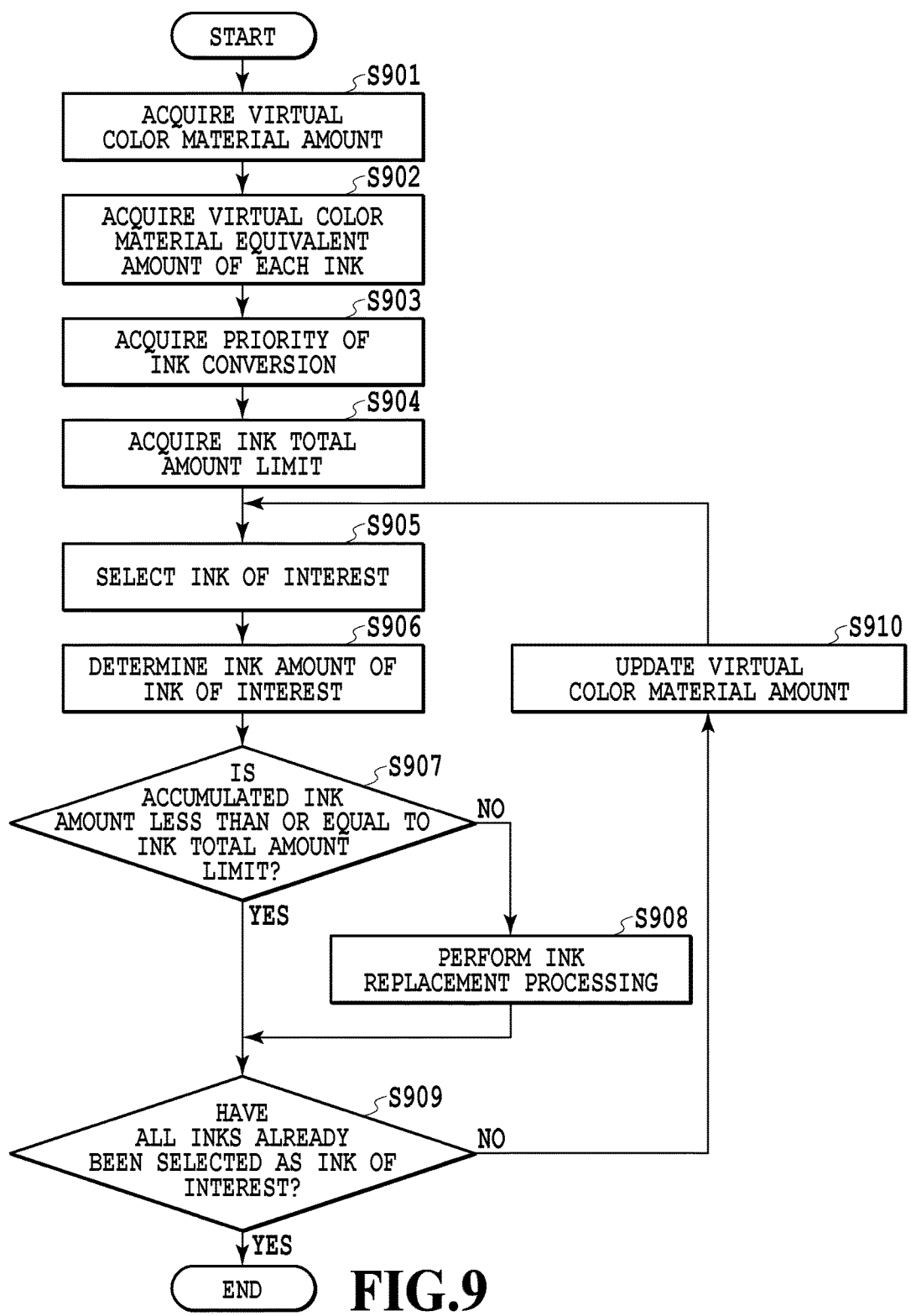
FIG. 9 is a flowchart showing a flow of processing of conversion into an actual color material (ink amount) according to the first embodiment.
Figure 10:
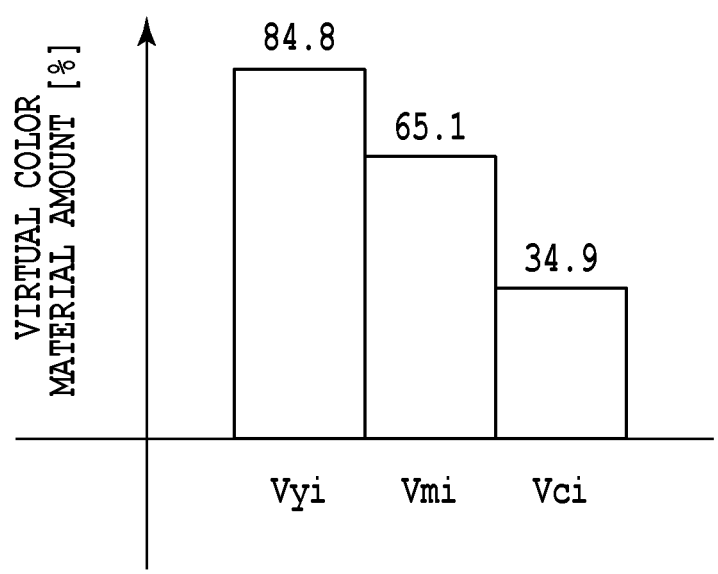
FIG. 10 is a diagram showing an example of a virtual color material amount that is the source of conversion.

FIG. 9 is a flowchart showing a flow of the conversion processing into the actual color material amount (ink amount) according to the present embodiment. First, at step 901, the virtual color material amounts Vyi, Vmi, and Vci that are the source of conversion are acquired. FIG. 10 shows an example of the virtual color material amounts Vyi, Vmi, and Vci that are the source of conversion. The virtual color material amounts shown in FIG. 10 are found as follows.

First, in the case where the RGB values as an input image signal are R=177, G=129, and B=105, the target block densities T_Dy=0.848, T_Dm=0.651, and T_Dc=0.349 are obtained from expressions (3-1) to (3-3) described above. On the other hand, in the case where it is assumed that the block density Dy of the virtual color material yi in the applied material amount V0=25[%] of each virtual color material is 0.25, i.e., Dy=0.25, the constant of proportion α_y=(100/V0)×Dy0=1.00 is obtained. Similarly, it is assumed that the constants of proportion are α_m=α_c=1.00. Then, from the target block densities and the constants of proportion that are obtained, by expressions (2-1) to (2-3) described above, the virtual color material amounts Vyi=84.8[%], Vmi=65.1[%], and Vci=34.9[%] shown in FIG. 10 are obtained. For example, the virtual color material amount Vyi=84.8% means that the yellow ink as the virtual color material is applied to the corresponding pixel with a probability of 84.8% on the average and an ink dot is formed. In the present embodiment, a probability that a dot is formed in a pixel obtained by dividing one square inch into 1,200×1,200 portions is supposed.

At step 902 that follows, virtual color material amounts Vyi_x, Vmi_x, and Vci_x in the case where an ink x as the actual color material is represented by equivalent virtual color materials (hereinafter, virtual color material equivalent amounts) are acquired. As described previously, it is possible to uniquely convert an arbitrary spectral reflectance into the amounts Vyi, Vmi, and Vci of the virtual color materials yi, mi, and ci by expression (1) and expression (2-1) to expression (2-3) described above. That is, it is possible to uniquely convert the spectral reflectance in the case of a unit amount W0[%] of the ink x, which is arbitrary, into the virtual color material equivalent amounts Vyi_x, Vmi_x, and Vci_x. In the present embodiment, for all the inks x used in the image forming apparatus 200, as the equivalent values of the virtual color materials per unit amount of the ink x, Vyi_x, Vmi_x, and Vci_x are acquired. Specifically, the procedure is as follows.

First, the image forming apparatus 200 outputs print data whose applied material amount is W0[%]. Next, a spectral reflectance Refp (λ) at the printed portion and a spectral reflectance Ref0 (λ) at the paper white portion in the output printed matter are measured by using a colorimeter such as a spectral colorimeter. Further, by expression (4) below, the spectral reflectance Ref (λ) of the ink is calculated.

$$\text{Ref}(\lambda) = \text{Refp}(\lambda)/\text{Ref0}(\lambda) \quad \text{expression (4)}$$

After this, from the obtained spectral reflectance Ref (λ), the virtual color material equivalent amounts Vyi_x, Vmi_x, and Vci_x per unit applied material amount W0[%] are found by expression (1) and expression (2-1) to expression (2-3) described previously. The above-described processing is performed for all the inks (here, five colors) used in the image forming apparatus 200. Alternatively, it may also be possible to read the virtual color material equivalent amounts of each ink held in the form of a table or the like by acquiring in advance the virtual color material equivalent amounts of each ink by the above-described method. FIG. 11A to FIG. 11E each show an example of the virtual color material equivalent amounts of each ink. FIG. 11A shows the virtual color material equivalent amounts of the gray ink per unit applied material amount W0[%] described above. Similarly, FIG. 11B shows the virtual color material equivalent amounts per unit applied material amount W0[%] of the cyan ink, FIG. 11C shows those of the magenta ink, FIG. 11D shows those of the yellow ink, and FIG. 11E shows those of the black ink, respectively. In this example, it is assumed that the virtual color material amounts are Vyi=84.8 [%], Vim=65.1 [%], and Vci=34.9 [%]. Then, it is also assumed that each of the block densities T_Dy, T_Dm, and T_Dc in the case of the unit applied material amount W0=25.0 [%] of each of gray, cyan, magenta, yellow, and black inks is as follows.

TABLE 1

|    | T_Dy | T_Dm  | T_Dc  |
|----|------|-------|-------|
| gy | 0.15 | 0.16  | 0.17  |
| c  | 0.07 | 0.095 | 0.2   |
| m  | 0.06 | 0.275 | 0.045 |
| y  | 0.35 | 0.025 | 0.01  |
| k  | 0.53 | 0.555 | 0.585 |

At this time, the virtual color material equivalent amounts of each ink that are obtained from the above-described block density are as in the following table from expression (2-1) to expression (2-3) described above and the virtual color material equivalent amounts coincide with those in FIG. 11A to FIG. 11E.

TABLE 2

|    | Vyi | Vmi  | Vci  |
|----|-----|------|------|
| gy | 15  | 16   | 17   |
| c  | 7   | 9.5  | 20   |
| m  | 6   | 27.5 | 4.5  |
| y  | 35  | 2.5  | 1    |
| k  | 53  | 55.5 | 58.5 |

At subsequent steps 903 to 910, based on the virtual color material equivalent amounts of each ink acquired at step 902, the virtual color material amounts are converted into a combination of the ink amounts as the actual color material amounts. Specifically, each ink amount W is found so that the virtual color material equivalent amounts of each ink coincide with the target virtual color material equivalent amounts Vyi_x, Vmi_x, and Vci_x.

At step 903, information on the priority of conversion of each ink used in the image forming apparatus 200 is acquired. The priority of conversion is set so that, for example, the ink whose density is lower is given higher priority. Specifically, it is sufficient to acquire the maximum value of each of the virtual color material equivalent amounts Vyi_x, Vmi_x, and Vci_x acquired at step 902 and to set the priority so that the ink whose maximum value is lower is given higher priority. For example, the priority of conversion in the case of each ink shown in Table 2 described above, the priority is high in the order of gray, cyan, magenta, yellow, and black. In the case where the priority of conversion is set as described above, the conversion into the ink whose density is low is performed with priority, and therefore, it is possible to implement color conversion excellent in granularity. Of course, the determination method of the priority of conversion is not limited to the above-described example. For example, it may also be possible to determine the priority of conversion based on an average value in place of the maximum value of the virtual color material equivalent amount. Alternatively, it may also be possible to determine the priority of conversion based on the publicly known optical density OD in place of the virtual color material equivalent amount. Further, on the contrary to the above-described example, it may also be possible to set the priority of conversion so that the ink whose density is higher is given higher priority. In this case, the conversion into the ink whose density is high is performed with priority, and therefore, it is possible to reduce the ink total amount. As described above, at the time of determining the priority of conversion, only by changing the priority of the high-density ink and the low-density ink, it is possible to implement conversion characteristics optimum to a desired requirement, such as granularity, ink consumption, sharpness, and coloring of gloss. For example, in the case where priority is given to sharpness, priority is given to the high-density ink and in the case where priority is given to coloring of gloss, it is sufficient to give high priority to the ink whose hue is different from that of the conversion-target color. Due to this, it is made possible to suppress the specularly reflected light from becoming slightly magenta, which is caused by, for example, the yellow ink whose wavelength dependence is comparatively small being added to an image area formed by the cyan ink.

At step 904, the value of a limit to the ink total amount (Max_W[%]) determined in advance is acquired. This value of the total amount limit Max_W is given by a designer. For example, the limit value of the total amount is determined by the designer outputting a plurality of patches different in ink amount by the image forming apparatus 200 and finding the amount of ink that a printing medium can absorb without any problem. Alternatively, it may also be possible to determine the limit value of the total amount based on a table or a calculation expression by determining the table in which information on the amount of reduction in ink, the printing speed, and the number of print passes is described for each printing medium or the calculation expression.

At step 905, in accordance with the priority of conversion acquired at step 903, an ink on which attention is to be focused (ink of interest n) is selected from among all the inks. That is, from the inks used by the image forming apparatus 200, the ink that has not been selected yet as the ink of interest and whose priority is the highest is determined to be the ink of interest n.

A step 906, an ink amount Wn of the ink of interest n selected at step 905 is determined in accordance with Lambert's law. At this time, the ink amount of the ink of interest is determined so that at least one of the virtual color material amounts Vyi, Vmi, and Vci coincides with the virtual color material amount that is the source of conversion acquired at step 901. More specifically, ink amounts $Wn\_y$, $Wn\_m$, and $Wn\_c$ with which the virtual color material amounts Vyi, Vmi, and Vci are caused to coincide in the ink of interest n are found by using expression (5-1) to expression (5-3) below.

$$Wn\_y = W0/Vyi\_n \times Vyi \quad \text{expression (5-1)}$$

$$Wn\_m = W0/Vmi\_n \times Vmi \quad \text{expression (5-2)}$$

$$Wn\_c = W0/Vci\_n \times Vci \quad \text{expression (5-3)}$$

In expression (5-1) to expression (5-3) described above, $Vyi\_n$, $Vmi\_n$, and $Vmi\_n$ are the virtual color material equivalent amounts of the ink of interest n, respectively. Here, expression (5-1) described above is based on Lambert's law and in the case where it is assumed that $\beta n\_y = W0/(100 \times Vyi\_n)$, it is possible to transform expression (5-1) into expression (5-1') below. In this case, $\beta n\_y$ is a constant. Similarly, it is possible to transform expression (5-2) and expression (5-3) described above into expression (5-2') and expression (5-3') below, respectively. Here, it is assumed that $\beta n\_m = W0/(100 \times Vmi\_n)$ and $Pn\_c = W0/(100 \times Vci\_n)$.

$$Wn\_y = \beta n\_y \times Vyi \qquad \text{expression (5-1')}$$

$$Wn\_m = \beta n\_m \times Vmi \qquad \text{expression (5-2')}$$

$$Wn\_c = \beta n\_c \times Vci \qquad \text{expression (5-3')}$$

In expression (5-1') described above, $\beta n\_y$ is a value relating a ratio of the virtual color material $Vyi\_n$ equivalent to the ink of interest n in the predetermined amount W0[%] to the virtual color material amount Vyi included in the virtual color material yi in the same amount (W0[%]). That is, it is shown that the larger $\beta n\_y$, the smaller $Vyi\_n$ equivalent to the ink of interest n in the predetermined amount is. Consequently, it is meant that the larger $\beta n\_y$, the larger the ink amount Wn becomes, which causes the virtual color material amount that is the source of conversion to coincide with the virtual color material equivalent amount of the ink of interest n.

In this manner, from the ink amounts Wn_y, Wn_m, and Wn_c found from expression (5-1) to expression (5-3) or expression (5-1') to expression (5-3') described above, the ink amount Wn of the ink of interest is determined in accordance with the ink characteristics of the ink of interest n. Specifically, the maximum value is acquired for the virtual color material equivalent amounts Vyi_n, Vmi_n, and Vci_n of the ink of interest n is acquired and the ink amount that causes the virtual color material equivalent amount having the maximum value to coincide with the virtual color material amount that is the source of conversion is selected as Wn. For example, in the case where Vyi_n>Vmi_n and Vmi_n>Vci_n, Wn_y corresponding to Vyi_n whose virtual color material equivalent amount is the largest is taken to be the ink amount Wn of the ink of interest n. By doing so, the amount of the main virtual color material of the ink of interest n (e.g., in the case where the ink of interest is the yellow ink, the virtual color material amount Vyi) coincides with the virtual color material amount that is the source of conversion. Alternatively, the minimum value of Wn_y, Wn_m, and Wn_c is taken to be the ink amount Wn of the ink of interest n. By doing so, in the case where a plurality of main virtual color materials exists, such as the black ink, it is possible to determine the ink amount by taking into consideration each virtual color material amount. It may also be possible to find the maximum virtual color material amount from the virtual color material amounts acquired at step 901 and to select the ink amount that causes the virtual color material amount to coincide with the virtual color material that is the source of conversion as Wn irrespective of the ink characteristics.

At step 907, whether or not the accumulated value of the ink amounts determined for the ink of interest is within the range of the ink total amount limit Max_W acquired at step 904 is determined. Specifically, a total sum Sum_W of the ink amounts determined up to the present point in time and the ink total amount limit Max_W are compared and whether the total amount Sum_W is smaller than or equal to the total amount limit Max_W is determined. In the case where the results of the determination indicate that the total sum Sum_W is smaller than or equal to the total amount limit Max_W, the processing advances to step 909. On the other hand, in the case where the total sum Sum_W is larger than the total amount limit Max_W, the processing advances to step 908.

At step 908, ink replacement processing is performed. This processing is processing to convert the ink whose priority of conversion is high into the ink whose priority is lower and which exhibits substantially the same hue so that the accumulated ink amount (total sum Sum_W) and the ink total amount limit Max_W become equal to each other. At this time, the replacement is performed so that the virtual color material amount before the replacement substantially coincides with that after the replacement. By this processing, for example, the gray ink whose priority is high is replaced with the black ink whose priority is lower and which exhibits substantially the same hue. The replacement of the gray ink with the black ink is performed by using expression (6-1) and expression (6-2) below.

$$Wgy' = Wgy - (\text{Sum}\_W - \text{Max}\_W) \times \gamma/(\gamma - 1) \qquad \text{expression (6-1)}$$

$$Wk' = Wk + (\text{Sum}\_W - \text{Max}\_W)/(\gamma - 1) \qquad \text{expression (6-2)}$$

In expressions (6-1) and (6-2) described above, Wgy and Wk are the ink amount of the gray ink before the replacement and that of the black ink before the replacement, respectively, and Wgy' and Wk' are the ink amount of the gray ink after the replacement and that of the black ink after the replacement, respectively. Here, the ratio between the virtual color material equivalent amounts Vyi_n, Vmi_n, and Vci_n is regarded as substantially the same and the gray ink is replaced with the black ink by using a ratio of replacement $\gamma$. The ratio of replacement $\gamma$ is found by, for example, V_k/V_gy. Here, V_k is the total sum of virtual color material equivalent amounts Vyi_k, Vmi_k, and Vci_k of the black ink and V_gy is the total sum of virtual color material equivalent amounts Vyi_gy, Vmi_gy, and Vci_gy. As the ratio of replacement $\gamma$, for example, it may also be possible to acquire the maximum value of the virtual color material equivalent amounts Vyi_n, Vmi_n, and Vci_n and to use the ratio of the virtual color material equivalent amount having the maximum value. In particular, in each of the cyan, magenta, and yellow inks, the ratio of the main virtual color material equivalent amount is important, and therefore, it is desirable to use the ratio of the virtual color material equivalent amount having the maximum value.

It is also possible to hold in advance combinations of ink amounts that exhibit substantially the same hue as that of gray and to perform replacement based on the ratio of the combination. For example, it may also be possible to hold combinations of the ink amounts of the black, cyan, magenta, and yellow inks, which substantially coincide with the virtual color material equivalent amounts of the gray ink in the ink amount W0[%] and to replace the gray ink with a combination of the black, cyan, magenta, and yellow inks so that the total sum Sum_W and the total color material amount limit Max_W become equal to each other. By the replacement processing as described above, the accumulated value of the ink amounts is controlled so as not to exceed the value of the ink total amount limit Max_W.

At step 909, whether or not all the inks used in the image forming apparatus 200 have already been selected as the ink of interest is determined. In the case where all the inks have already been selected as the ink of interest, this processing is terminated. On the other hand, in the case where the ink that has not been selected yet as the ink of interest exists, the processing advances to step 910.

At step 910, the virtual color material amounts that are the source of conversion are updated. Specifically, the virtual color material amounts are updated to virtual color material amounts Vyi", Vmi", and Vci" obtained by using expression (7-1) to expression (7-3) below.

$$Vyi''=Vyi-Vyi'  \quad \text{expression (7-1)}$$

$$Vmi''=Vmi-Vmi'  \quad \text{expression (7-2)}$$

$$Vci''=Vci-Vci'  \quad \text{expression (7-3)}$$

In expression (7-1) to expression (7-3) described above, Vyi, Vmi, and Vci are the virtual color material amounts acquired at step 901. Further, each of Vyi', Vmi', and Vci' is the total sum of the virtual color material equivalent amounts, which is calculated from each ink amount W and the virtual color material equivalent amount obtained at step 906 or at step 908. For example, Vyi' is ΣWx+Vyi_x. It is assumed that the values of the virtual color material equivalent amounts Vyi", Vmi", and Vci" after the updating are taken to be values larger than or equal to 0 and in the case where the value becomes a negative value as the results of using expression (7-1) to expression (7-3) described above, the virtual color material equivalent amount after the updating is set to 0. Vyi", Vmi", and Vci" after the updating obtained as described above are used as the virtual color material amounts that are the targets of coincidence in the processing of the next ink of interest n.

Here, the processing at each of step 905 to step 910 described above is explained by showing a specific example. In the following explanation, it is assumed that the virtual color material amounts that are the source of conversion, which are acquired at step 901, are Vyi=84.8[%], Vmi=65.1[%], and Vci=34.9[%] shown in FIG. 10 described previously. Further, it is also assumed that the virtual color material equivalent amounts acquired at step 902 are values shown in FIG. 11A to FIG. 11E described previously. Furthermore, it is also assumed that the priority of ink conversion acquired at step 903 is in the order of the gray, cyan, magenta, yellow, and black inks from the highest priority. Still furthermore, it is assumed that the ink total amount limit Max_W=100[%].

First, in accordance with the priority of conversion, the gray ink is selected as the ink of interest (S905). Next, the ink amount Wgy of the gray ink, which is the ink of interest, is determined (S906). FIG. 12A to FIG. 12D-b are diagrams showing a specific determination procedure. FIG. 12A shows the virtual color material amounts that are the source of conversion acquired at step 901 and as described above, Vyi=84.8[%], Vmi=65.1[%], and Vci=34.9[%]. FIG. 12B-a shows the virtual color material amounts Vyi, Vmi, and Vci by the gray ink in the case where the virtual color material amount Vyi is caused to coincide by the virtual color material equivalent amounts of the gray ink shown in FIG. 11A. An ink amount Wgy_y that causes the virtual color material amount Vyi to coincide at this time is shown in FIG. 12B-b. That is, the ink amount Wgy_y=W0/Vyi_gy× Vyi=25.0/15.0×84.4=141.3[%] that is found by using expression (5-1) described previously so that the virtual color material amount Vyi shown in FIG. 12A is obtained is that shown in FIG. 12B-b. At this time, βn_y=W0/Vyi_gy=25.0/15.0=1.67, and therefore, the virtual color material amounts in the case where the ink amount Wgy_y=141.3[%] will be Vyi=84.8[%], Vmi=90.4[%], and Vci=96.1[%] as shown in FIG. 12B-a. Similarly, the virtual color material amounts in the case where the virtual color material amount Vmi is caused to coincide are shown in FIG. 12C-a and an ink amount Wgy_m is shown in FIG. 12C-b. Further, the virtual color material amounts in the case where the virtual color material amount Vci is caused to coincide are shown in FIG. 12D-a and an ink amount Wgy_c is shown in FIG. 12D-b. Here, it is assumed that the minimum value of Wgy_y, Wgy_m, and Wgy_c is used as the ink amount Wgy of the gray ink. In this case, Wgy_y=141.3[%]>Wgy_c=51.3[%], Wgy_m=101.7[%] >Wgy_c=51.3[%], and therefore, Wgy=Wgy_c=51.3[%]. Also in the case where determination is performed by taking the maximum value of the virtual color material equivalent amounts Vyi_n, Vmi_n, and Vci_n of the ink of interest to be the criterion, Vyi=15[%], Vmi=16[%], and Vci=17[%]. In this case, the ink amount Wgy that is caused to coincide with the virtual color material amount that is the source of conversion is selected so that the virtual color material equivalent amount Vci, which is the maximum value, becomes 34.9[%], and therefore, Wgy=Wgy_c=51.3[%] also holds.

Next, the ink amount Wgy of the gray ink and the ink total amount limit Max_W are compared (S907) and further, the ink replacement processing is performed in accordance with the necessity (S908). After this, the determination of termination is performed (S909) and in the case where there is an unprocessed ink, the virtual color material amounts are updated (S910) and the processing by taking the next ink to be the ink of interest is repeated. Each change in the "virtual color material amounts that are the source of conversion", the "virtual color material amounts by the ink of interest", the "ink amount of each ink", and the "accumulated ink amount" in the loop processing at step 905 to step 910 described above is explained with reference to figures.

Each of FIG. 13A to FIG. 13D shows the "virtual color material amounts that are the source of conversion", the "virtual color material amounts by the ink of interest", the "ink amount of each ink", and the "accumulated ink amount" in the first loop. As described previously, in the first loop, as the ink of interest, the gray ink is selected (S905). The ink amount Wgy of the gray ink is Wgy_c=51.3[%], which is the minimum value of Wgy_y, Wgy_m, and Wgy_c. Consequently, as shown in FIG. 13C, the ink amount Wgy of the gray ink=51.3[%] is determined (S906). In this stage, the ink amounts of the other inks are 0, and therefore, the accumulated ink amount=Wgy, and therefore, 51.3[%] (see FIG. 13D). Then, the accumulated ink amount the total amount limit Max_W (=100[%]) holds (Yes at S907), and therefore, the replacement processing is not performed in the first loop. Further, in the determination of termination, inks that have not been selected yet as the ink of interest exist (No at S909), and therefore, the virtual color material amounts that are the source of conversion are updated (S910). By this updating processing, Vyi=84.8[%], Vmi=65.1[%], and Vci=34.9[%] shown in FIG. 13A are updated to values obtained by subtracting the virtual color material amounts by the ink of interest (Vyi=30.8[%], Vmi=32.8[%], and Vci=34.9[%]) from those. FIG. 14A shows the virtual color material amounts that are the source of conversion after the updating and Vyi=54.0[%], Vmi=32.3[%], and Vci=0[%] are shown.

Each of FIG. 14A to FIG. 14D shows the "virtual color material amounts that are the source of conversion", the "virtual color material amounts by the ink of interest", the "ink amount of each ink", and the "accumulated ink amount" in the second loop. In the second loop, in accordance with the priority of conversion, the cyan ink is selected as the ink of interest (S905). Here, it is assumed that an ink amount Wc_c that satisfies the virtual color material amount Vci corresponding to a maximum value Vci_c of the virtual color material equivalent amounts of the cyan ink is taken to be the ink amount Wc of the cyan ink. Here, as shown in FIG. 14A, the virtual color material amount that is the source of conversion Vci=0, and therefore, Wc=0 and all the virtual color material amounts by the ink of interest are also 0 (see FIG. 14B). Then, because Wc=0, the accumulated ink amount=Wgy+Wc remains unchanged, i.e., 51.3 [%] (see FIG. 14C). Consequently, the accumulated ink amount the total amount limit Max_W (=100[%]) holds (Yes at S907), and therefore, the ink replacement processing is not performed also in the second loop. Then, inks (magenta, yellow, black) that have not been selected yet as the ink of interest exist (No at S909), and therefore, the virtual color material amounts that are the source of conversion are updated (S910). At this point in time, all the virtual color material amounts by the ink of interest are 0, and therefore, substantially the same state as that in FIG. 14A is maintained (see FIG. 15A).

Each of FIG. 15A to FIG. 15D shows the "virtual color material amounts that are the source of conversion", the "virtual color material amounts by the ink of interest", the "ink amount of each ink", and the "accumulated ink amount" in the third loop. In the third loop, in accordance with the priority of conversion, the magenta ink is selected as the ink of interest. Here, as in the case of the cyan ink, an ink amount Wm_m that satisfies the virtual color material amount Vmi corresponding to a maximum value Vmi_m of the virtual color material equivalent amounts thereof is taken to be the ink amount Wm of the magenta ink. Here, the ink amount Wm=29.3[%] (see FIG. 15C). As a result of this, as shown in FIG. 15D, the accumulated ink amount Wgy+Wc+Wm=80.6[%]. In this stage also, the accumulated ink amount the total amount limit Max_W (=100[%]) holds, and therefore, the replacement processing is not performed also in the third loop. Then, inks (yellow, black) that have not been selected yet as the ink of interest exist (No at S909), and therefore, the virtual color material amounts that are the source of conversion are updated (S910). By this updating processing, Vyi=54.0[%], Vmi=32.3[%], and Vci=0[%] shown in FIG. 15A are updated to values obtained by subtracting the virtual color material amounts by the ink of interest (Vyi=7.04[%], Vmi=32.3[%], Vci=5.28[%]) from those. Here, the virtual color material amount Vci' after the updating should naturally become a negative value, but it is set to 0 following the rule described previously. FIG. 16A shows the virtual color material amounts that are the source of conversion after the updating and Vyi=47.0[%], Vmi=0 [%], and Vci=0[%] are shown.

Each of FIG. 16A to FIG. 16D shows the "virtual color material amounts that are the source of conversion", the "virtual color material amounts by the ink of interest", the "ink amount of each ink", and the "accumulated ink amount" in the fourth loop. In the fourth loop, in accordance with the priority of conversion, the yellow ink is selected as the ink of interest. As in the case of the cyan ink and the magenta ink, an ink amount Wy_y that satisfies the virtual color material amount Vyi corresponding to a maximum value Vyi_y of the virtual color material equivalent amounts thereof is taken to be the ink amount Wy of the yellow ink. Here, the ink amount Wy=33.5[%] (see FIG. 16C-a). As a result of this, as shown in FIG. 16D-a, the accumulated ink amount Wgy+Wc+Wm+Wy=114.2 [%]. In this stage, the accumulated ink amount>the total amount limit Max_W (=100 [%]) holds (No at step 907), and therefore, the ink replacement processing is performed (S908). That is, the processing to replace the gray ink whose priority is the highest with the black ink whose hue is the same and whose priority is low is performed by using expression (6-1) and expression (6-2) described previously. Here, the ratio of replacement γ=V_k/V_gy=(53+55.5+58.5)/(15+16+17)=3.48. Consequently, the ink amount Wgy' of the gray ink after the replacement processing will be 51.3−(114.2−100)× 3.48/(3.48−1)=31.4 [%]. Further, the ink amount Wk' of the black ink after the replacement processing will be 0+(114.2−100)/(3.48−1)=5.72 [%]. FIG. 16C-b and FIG. 16D-b show the ink amount of each ink and the accumulated ink amount after the replacement processing thus obtained, respectively. It is known that the accumulated ink amount is changed from the total sum Sum_W=114.2 [%] to 100[%], which is the ink total amount limit. Then, in the termination determination processing that follows, an ink (black) that has not been selected yet as the ink of interest exists (No at S909), and therefore, the virtual color material amounts that are the source of conversion are updated (S910). By this updating processing, the virtual color material amounts that are the source of conversion shown in FIG. 16A are updated to values obtained by subtracting the virtual color material amounts of the ink of interest shown in FIG. 16B from those. At this time, Vmi' and Vci' should naturally become negative values, but both values are set to 0 following the rule described previously. As a result of this, the virtual color material amounts after the updating enter the state shown in FIG. 17A where Vyi=0[%], Vmi=0[%], and Vci=0[%].

Each of FIG. 17A to FIG. 17D shows the "virtual color material amounts that are the source of conversion", the "virtual color material amounts by the ink of interest", the "ink amount of each ink", and the "accumulated ink amount" in the final loop. In the final loop, the black ink whose priority is the lowest is selected as the ink of interest. As the ink amount Wk of the black ink, as in the case of the gray ink, the minimum value of Wk_y, Wk_m, and Wk_c is used. However, as shown in FIG. 17A, all the values of the virtual color material amounts that are the source of conversion at this point in time are 0, and therefore, Wk=0 results. Here, for the black ink, by the replacement processing in the fourth loop, the ink amount Wk=5.72[%] has already been given. Because of this, the value obtained by adding the value of Wk that is found in this loop to the value already given will be the value of the final ink amount Wk. In the present embodiment, the value of the ink amount Wk that is found in the final loop is 0, and therefore, the value given by the replacement processing in the fourth loop, i.e., 5.72[%], will be the value of the final ink amount Wk (see FIG. 17C). Consequently, the value of the accumulated ink amount is also the same value as that after the fourth loop, i.e., 100[%] (see FIG. 17D). Then, in the termination determination processing that follows, an ink that has not been selected yet as the ink of interest does not exist, and therefore, the processing to convert the virtual color material amount into the ink amount ends. It is known that Vyi=84.8 [%] of the initial virtual color material amounts Vyi, Vmi, and Vci coincides with the total value (30.8+0+7.04+47.0+0=84.8) of the determined virtual color material amounts of each ink at the point in time at which the output values of all the inks are determined.

Figure 18A:
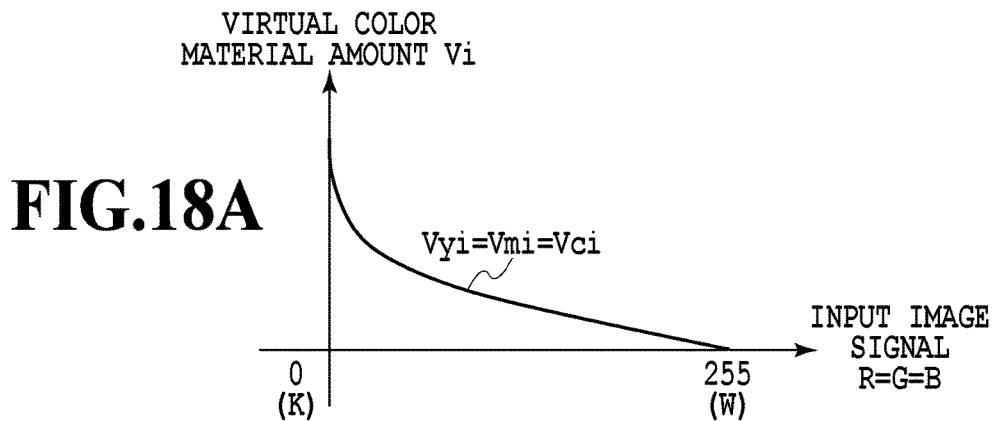
FIG. 18A to FIG. 18C are diagrams showing a separation example of an ink amount for an input image signal.
Figure 18B:
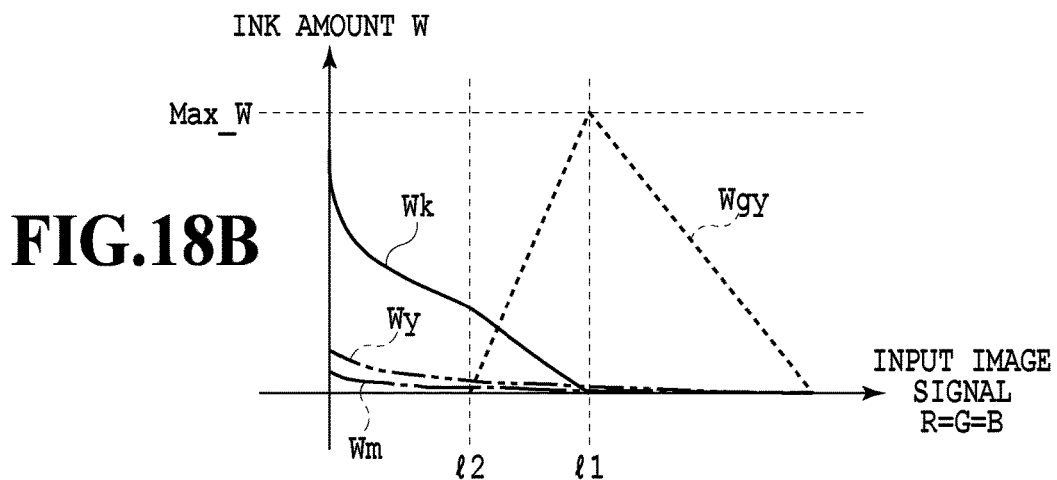
Figure 18C:
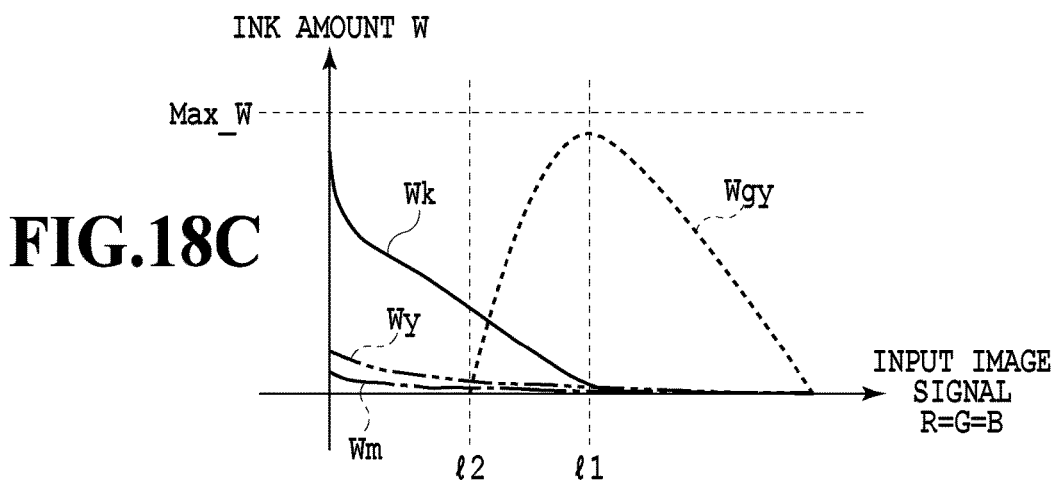

FIG. 18A to FIG. 18C each show a separation example of the ink amount for an input image signal in the present embodiment. FIG. 18A is a separation example of the virtual color material amount for an input image signal on the gray line (R=G=B=0 to 255) connecting W (R=G=B=255) and K (R=G=B=0) in the color cube shown in FIG. 2. FIG. 18B is a separation example of the ink amount for an input image signal.

In the case where the color conversion processing based on the concept as described above is performed by using the color conversion LUT 111, it is necessary to find the ink amount corresponding to the input RGB value in accordance with the flow in FIG. 3 described previously and to create a table. For example, in the case where the color conversion LUT 111 is an LUT having 17×17×17 grid points, the virtual color material amounts are derived from the block density corresponding to each grid point and after the virtual color material amounts are converted into the ink amount of each ink used in the printer, the input image signal (RGB value) and the ink amount are associated with each other. Alternatively, in the case of the color conversion LUT 111 having the ink amount corresponding to an 8-bit input RGB value in a one-to-one manner, the virtual color material amounts are derived from the block density corresponding to sixteen million colors (=256×256×256) and after the virtual color material amounts are converted into the ink amount, the RGB value and the ink amount are associated with each other.

Modification Example

There may be a configuration in which the color conversion LUT 111 is not used and each time an image signal is input, the color conversion in accordance flow in FIG. 3 described previously is performed in the color conversion processing unit 102. In this case, in place of the color conversion LUT 111, it is sufficient to hold only the information on the priority of conversion of inks used in the image forming apparatus 200. Then, each time an image signal is input, the color conversion processing unit 102 derives the virtual color material amounts from the input RGB value (S301) and converts the virtual color material amounts into the ink amount of each ink (S302).

Alternatively, it may also be possible to hold information on the virtual color material amounts corresponding to the input RGB value that are found in advance in the form of an LUT, in addition to the priority of ink conversion. In this case, it is sufficient for the color conversion processing unit 102 to, each time an image signal is input, skip the processing at step 301 and to perform only the processing to convert the virtual color material amounts into the ink amount of each ink.

In the present embodiment, explanation is given on the assumption that the priority of ink conversion and the priority in the ink replacement processing are the same, but they do not necessarily need to be the same. For example, for the ink whose priority of conversion is set high in order to prevent the bronze phenomenon and thin film interference, it may also be possible to reduce the priority in the ink replacement processing.

Further, in the present embodiment, in the updating processing (S910) of the virtual color material amounts that are the source of conversion, in the case where the virtual color material amount after the updating becomes a negative value, the virtual color material amount is set to 0. By replacing a negative value with 0 as described above, an error occurs and a difference arises between the input RGB value and the color that is formed actually. Consequently, in the processing (S906) to determine the ink amount of the ink of interest, for the ink whose priority is high, instead of determining the ink amount so that the main virtual color material of the ink of interest coincides with the virtual color material amount that is the source of conversion, it may also be possible to set an amount smaller than the ink amount in the case of coincidence. For example, the ink amount Wn of the ink of interest is set to an ink amount that does not exceed the virtual color material amount that is the source of conversion (e.g., an ink amount that satisfies 90% of the virtual color material that is the source of conversion). Then, the loop processing to determine an ink amount that does not exceed the virtual color material amount that is the source of conversion is performed until the number of virtual color material amounts and the number of inks that have not been selected yet as the ink of interest become equal. After this, the ink amount of inks that have not been selected yet are determined by using an equation relating to the ink amount and each virtual color material amount. By doing so, the virtual color material amounts that are acquired at first and the virtual color material amounts by all the inks used in the image forming apparatus 200 substantially coincide with each other and it is possible to suppress a difference between the input RGB value and the color that is formed actually. As described previously, in the present embodiment, it is premised that the color matching processing unit 101 is in charge of the processing to cause the input RGB value of an image signal to match with the color that is formed actually on a printing medium, and therefore, it is unlikely that the occurrence of an error as described above becomes a significant problem. By ignoring an error in the virtual color material amount that is not the main in the ink of interest, it is possible to suppress many inks whose priority is low from being included compared to the case where the total virtual color material amount of all the inks are caused to substantially coincide. Further, it is also possible to suppress the amount of calculation.

Figure 19:
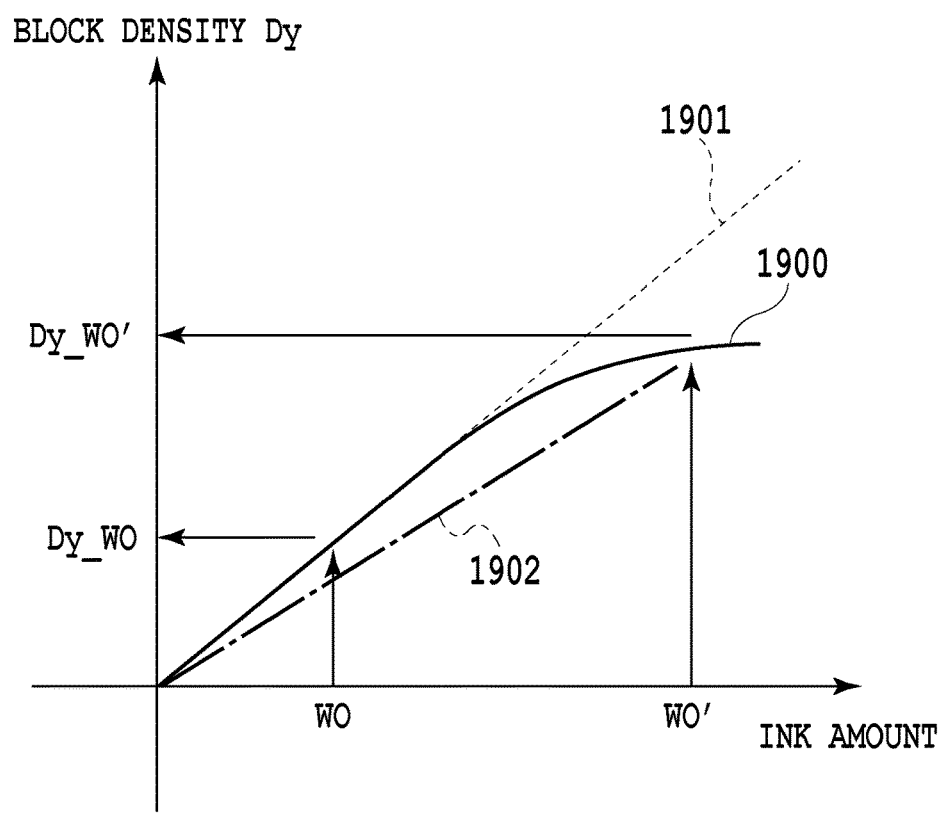
FIG. 19 is a diagram showing an example of a relationship between an ink amount and a block density Dy.

Further, in the present embodiment, the virtual color material amounts are converted into the ink amount by linear combination, and therefore, in the case where a relationship between two different ink amounts and the virtual color material amounts can be acquired for each ink, it is possible to perform conversion. For example, it is possible to perform the conversion processing by measuring two patches of paper white and in the predetermined ink amount W0[%] for each ink. However, for a common ink, it is known that Lambert's law does not hold in an area where the ink amount is very large. FIG. 19 is a graph representing an example of a relationship between the ink amount (horizontal axis) and the block density Dy (vertical axis). In this graph, a solid line 1900 indicates the actually measured values of the block density Dy. In the graph in FIG. 19, for the predetermined ink amount W0, it is desirable to use an area in which the relationship between the ink amount and the block density changes linearly. For example, in the case where ejection of 1,200×1,200 ink droplets in one square inch with an ejection amount of 4 pl is taken to be 100%, 25% is used as the predetermined ink amount W0. However, in the case where the virtual color material equivalent amounts derived on the assumption that the predetermined ink amount W0=25% are used to determine the ink amount of the ink of interest (S906), the ink amount is determined in accordance with characteristics indicated by a dot line 1901, and therefore, a supposed density is not obtained in the high-density portion. In this case, in order to obtain a supposed maximum density by a desired ink amount, it is sufficient to use an ink amount W0' that implements a maximum density Dy_W0' as the predetermined ink amount. However, by simply using the predetermined ink amount W0' such as this, the ink amount is determined on the assumption that the ink amount and the maximum density change with characteristics indicated by a one-dot chain line 1902, and therefore, the halftone becomes dark this time. There is a way of thinking that it is sufficient to correct the halftone that has become dark by color matching as described previously. However, in the case where the color conversion LUT 111 has thinned grid point values and a value of an area other than the grid point is found by linear interpolation, it is desirable to be linear with the density from the viewpoint of an interpolation error. Consequently, the conversion from the virtual color material equivalent amounts into the ink amount is performed without using expressions (5-1) to (5-3) based on Lambert's law described previously. For example, it may also be possible to determine the ink amount from the virtual color material equivalent amounts by using a one-dimensional table in which the ink amount becomes larger in the high-density portion, a nonlinear function, and so on.

Further, in the present embodiment, as the virtual color material amount and the ink amount, the applied material amount [%] is used as the value for which Lambert's law holds. However, the virtual color material amount and the ink amount are not limited to the applied material amount [%] and any value is acceptable as long as Lambert's law holds for the value. For example, it may also be possible to use the pixel value of the ink value image that is used for halftone processing. Alternatively, it may also be possible to convert the virtual color material amount and the ink amount into values for which Lambert's law holds, such as the coverage factor and the film thickness, at the time of color conversion processing, by using the weight (picogram) and the volume (picoliter). In this case, the virtual color material amount is converted into the ink amount by linear combination. Because of this, in the case where the virtual color material amount changes smoothly, the ink amount after the conversion also changes smoothly, and therefor, it is possible to obtain a color conversion LUT with favorable gradation properties.

The virtual color materials yi, mi, and ci in the method of the present embodiment do not depend on a printer or a set of color materials to be used. For example, even in the case where a red ink is added to the ink set of the five color inks described previously, on a condition that the priority of conversion of the colors including red is determined, it is possible to convert the ink set into an ink set including the red ink. At this time, from the ink characteristics of the red ink (see FIG. 11F), the main virtual color materials of the red ink are determined to be yi and mi and the minimum value of Wn_y and Wn_m is taken to be an ink amount Wr of the red ink as the ink of interest. By doing so, it is possible to determine the ink amount Wr by taking into consideration the ink characteristics of the red ink. As described above, even in the case of a different ink set, it is possible to deal with the case only by changing the priority to be referred to.

Further, it may also be possible to make the priority of ink conversion differ in accordance with the position in the color conversion LUT 111. For example, on the line that connects the primary point of cyan and the primary point of black, it may also be possible to give priority to the cyan and black inks or to perform conversion into only the cyan and black inks. Further, it may also be possible to give higher priority to the ink whose correlation with the ratio of the target virtual color material is higher.

In the case where a clear color material (clear ink and the like) is included in the actual color materials, it is not necessary to take into consideration the clear color material in particular (the clear color material does not have any relationship with the priority of conversion) from the viewpoint of the color conversion of an input image signal, but it is necessary to take into consideration the clear color material from the viewpoint of the ink total amount limit. That is, in the determination processing at step 907, it is necessary to subtract the output value of the clear ink from the ink total amount limit Max_W. Specifically, from the total amount limit Max_W, a predetermined clear ink amount cl is subtracted, and a value (Max_W−cl) after the subtraction and the total sum of the ink amounts Sum_W are compared, and whether the total sum Sum_W is less than or equal to the total amount limit after the subtraction is determined. It may also be possible to determine the predetermined clear ink amount from the glossiness data that is input along with the input image data or to determine in advance the clear ink amount to be used for each page.

Figure 20:
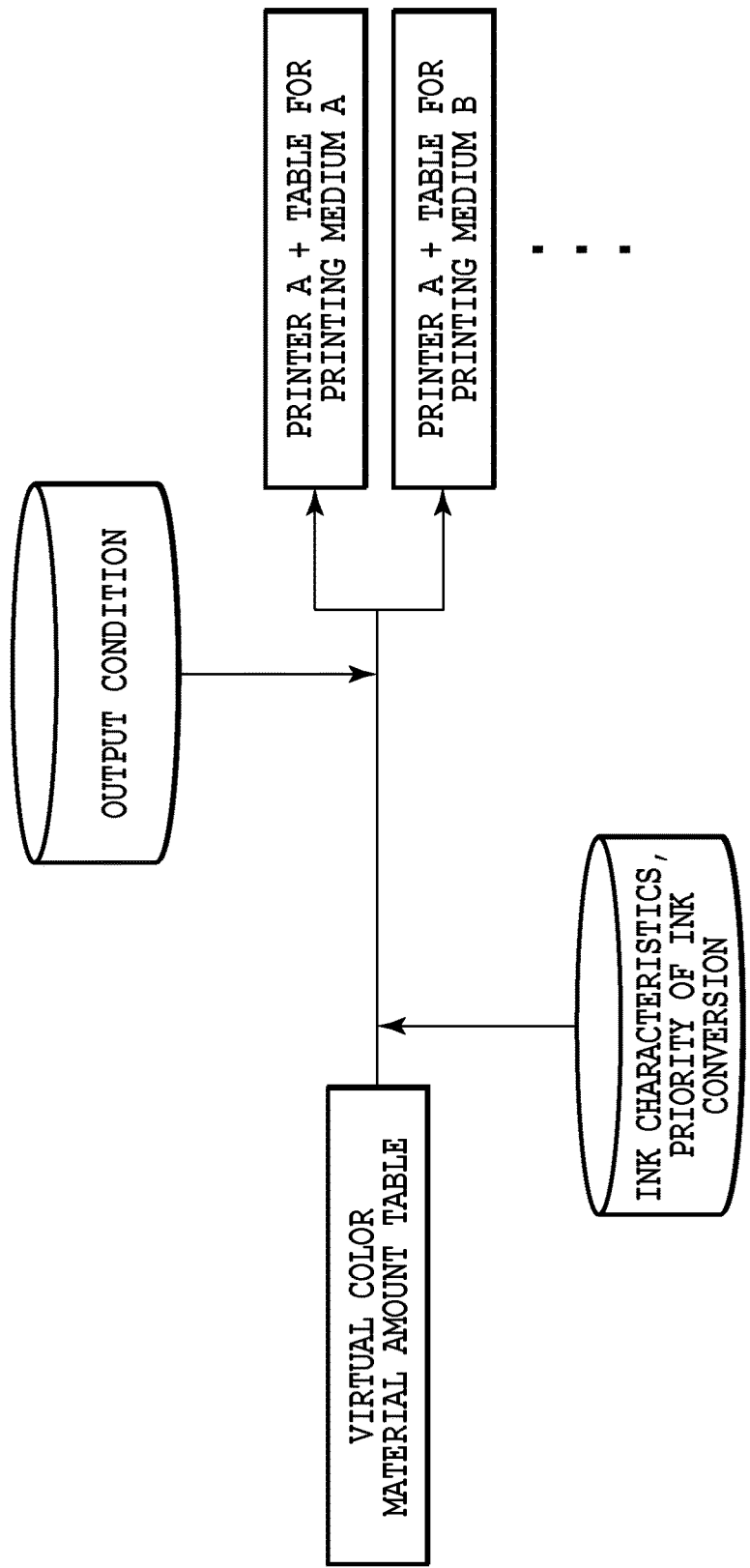
FIG. 20 is a diagram showing an example of a configuration for obtaining a color conversion LUT in accordance with an output condition.

Further, it may also be possible to create a color conversion LUT corresponding to different output conditions from the same virtual color material amount table by changing the value of the ink total amount limit in accordance with the output conditions, such as the type of printing medium (plain sheet, coated sheet, and so on), the printing speed, the number of passes in the multipass printing scheme. Here, the virtual color material amount table is a table in which the input image signal and the virtual color material amount are associated with each other. For example, a database storing information on the characteristics of each ink used in the printer and the priority of ink conversion is prepared, and further, a database storing the above-described output conditions is prepared, and thereby, a color conversion LUT in accordance with actual output conditions is created each time (see FIG. 20). By designing such a configuration, it is possible to obtain a color conversion LUT in accordance with the necessity, which corresponds to each printing mode, such as the printing mode in which priority is given to granularity and the printing mode in which priority is given to ink consumption, for each image forming apparatus while maintaining smoothness of gradation.

According to the present embodiment, it is possible to easily implement color conversion processing in which discontinuity in output gradation is reduced and smooth gradation properties are guaranteed.

Second Embodiment

In the modification example of the first embodiment, the aspect is described in which a color conversion LUT corresponding to a variety of printing modes, such as the printing mode in which priority is given to granularity and the printing mode in which priority is given to ink consumption, is obtained based on the virtual color material amount table created and held in advance. In the case where the above-described modification example is implemented, it is considered to set a color conversion LUT corresponding to a selected item by causing a user to select an arbitrary item via a UI screen from among items representing, for example, four kinds of printing grade, such as "Highspeed", "Standard", "High grade", and "Highest grade". In this case, a color conversion LUT corresponding to each item for the four kinds of printing grade is created in advance and saved in the HDD and the like, not shown schematically. For example, it is assumed that the above-described four kinds of printing grade are configured so as to be implemented by switching the number of print passes, such as High speed: four passes, Standard: eight passes, High grade: sixteen passes, and Highest grade: thirty-two passes. In this case, each color conversion LUT is prepared, which specifies the actual color material amounts corresponding to each of the above-described four kinds of number of passes. Further, each color conversion LUT is also prepared, which specifies the actual color material amounts in accordance with the types of printing medium, such as the maker's genuine "glossy sheet", "semi-glossy sheet", "matted sheet", and "plain sheet". Furthermore, in the case where the image forming apparatus has, for example, an ink-saving mode, a color conversion LUT corresponding to "ink-saving" is prepared.

In the case where an attempt is made to deal with all the combinations of the above-described various printing conditions, the number of color conversion LUTs to be prepared increases and the storage capacity of the HDD and the like necessary to store the color conversion LUTs will become very large. On the other hand, in the case where the color conversion LUTs in the number compatible with only limited combinations by taking into consideration restrictions on resources, it is not possible to fulfill a user's detailed request. For example, in the case where a user desires printing using a printing medium (e.g., a sheet having characteristics between those of the "semi-glossy sheet" and those of the "matted sheet") by a third party other than the maker's genuine sheet, no corresponding printing mode exists, and therefore, it is not possible to perform printing that matches with the sheet to be used. Alternatively, in the case where a user is not satisfied with the "Highest grade" image for which 32-pass printing processing has been performed and the user desires higher quality printing processing (e.g., 64-pass printing), no corresponding printing mode exists, and therefore, it is not possible to fulfill the user's request. Further, in the case where there are no restrictions on resources and it is possible to prepare a color conversion LUT capable of fulfilling the user's detailed request, it is not possible to deal with a new sheet developed after the creation of the color conversion LUT. In addition to the above, it is also not possible to deal with the case where the contents of a color conversion LUT need to be changed in accordance with the state of the image forming apparatus and the input image, for example, such as a color conversion LUT in accordance with the remaining ink amount (color conversion LUT for control so that each ink is consumed equally) and a color conversion LUT in accordance with the feature amount of an image.

Consequently, an aspect is explained as a second embodiment in which a color conversion LUT in accordance with a variety of requests of a user or a color conversion LUT in accordance with the state of the image forming apparatus and the feature of the input image is created in accordance with the necessity based on the color conversion LUT prepared and stored in advance. Explanation of the portions in common to those of the first embodiment is omitted or simplified and in the following, different points are explained mainly.

Outline of the Present Embodiment

In the present embodiment, it is assumed that a plurality of color conversion LUTs specifying a correspondence relationship between the input image signal and the actual color material amounts (ink amounts), which is compatible with the already-existing printing modes, is stored in advance in the HDD and the like, not shown schematically. Then, in the case where a use selects one of the already-existing printing modes, a color conversion LUT corresponding to the printing mode relating to the selection is read from the HDD and the like and color conversion processing is performed. On the other hand, in the case where a user specifies detailed printing conditions with which the already-existing printing mode is not compatible, an LUT (virtual color material amount LUT) that specifies a correspondence relationship between the input image signal and the virtual color material amounts is read from the HDD and the like and first, the virtual color material amounts for the input image signal are acquired. Then, while keeping the relationship (that increases monotonically and causes no inflection point to occur or whose number of inflection points is as small as possible) between the input image signal and the virtual color material amounts, the virtual color material amounts are converted into the actual color material amounts and a new color conversion LUT is created. As described above, by creating a new color conversion LUT in accordance with a request of a user based on the virtual color material amount LUT held in advance in accordance with the necessity, it is made possible to obtain the actual color material amounts in accordance with the detailed request of a user while keeping smooth gradation. In the following, detailed explanation is given.

(Configuration Example of Printing System)

Figure 21:
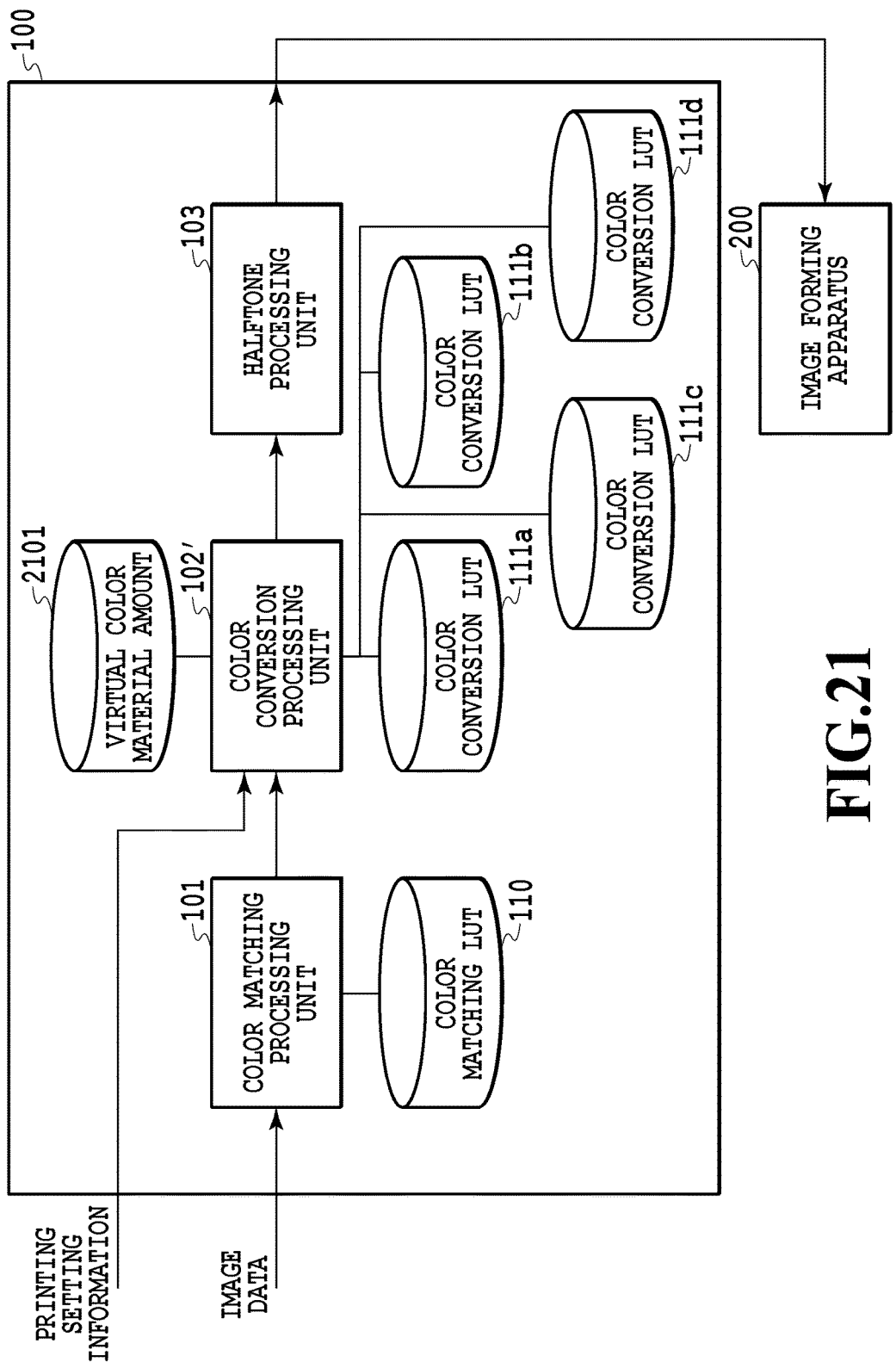
FIG. 21 is a block diagram showing an example of a configuration of a printing system according to a second embodiment.

FIG. 21 is a block diagram showing an example of a configuration of a printing system according to the present embodiment. The basic configuration is the same as that of the printing system shown in FIG. 1 of the first embodiment and includes the color matching processing unit 101, a color conversion processing unit 102', and the halftone processing unit 103. The difference from the first embodiment is the following two points.

First, to the color conversion processing unit 102' of the present embodiment, in addition to RGB image data for which color matching processing has been completed, printing setting information on the printing mode or the like that is applied to the printing processing of the RGB image data is input. Then, the color conversion processing unit 102' analyzes the input printing setting information and acquires an LUT that is used for color conversion processing from color conversion LUTs 111a to 111d prepared in accordance with each printing mode, or creates an LUT by referring to a virtual color material amount LUT 2101. As in the first embodiment, it is assumed that the color conversion processing unit 102' generates an image (ink value image) corresponding to each ink used in the in the image forming apparatus 200 from input RGB image data.

(Printing Setting)

Before explaining the color conversion processing according to the present embodiment, the printing modes that a user can select and the printing conditions that a user can specify are explained. FIG. 22 is a diagram showing an example of a printing setting screen that is displayed on a monitor (not shown schematically) or the like of the image processing apparatus 100. Via a Printing setting screen 2200, a user performs various settings relating to printing processing. On the Printing setting screen 2200, a "Page setting" tab, a "Finish" tab, a "Sheet feed" tab, a "Printing grade" tab, and a "Detailed setting" tab exist and a user selects an arbitrary tab and performs a printing setting in accordance with his/her purpose. On the Printing setting screen 2200 in FIG. 22, the "Detailed setting" tab is selected. In this "Detailed setting" tab, it is possible to specify detailed printing conditions and in accordance with the setting contents specified here, a new color conversion LUT is created based on the virtual color material amount LUT 2101. In the "Printing grade" tab, not shown schematically, the four kinds of printing mode, i.e., "High speed", "Standard", "High grade", and "Highest grade" described previously exist and a user selects one arbitrary printing mode from these four printing modes. Then, a user who thinks that desired printing results cannot be obtained by the already-existing printing modes that can be selected from the "Printing grade" tab specifies the "Detailed setting" tab on the Printing setting screen 2200 and specifies more detailed conditions. Specifically, a user checks a checkbox 2201 to make detailed settings effective and specifies more detailed conditions in accordance with the purpose in a "Printing grade" field 2210, a "Sheet setting" field 2220, and an "Ink reduction etc." field 2230, respectively. Then, by pressing down an OK button 2202, conditions (printing settings) to be applied to the printing processing are settled. In the following, printing settings that can be specified in the "Detailed setting" tab are explained.

<Detailed Setting Relating to "Printing Grade">

First, in the "Printing grade" field 2210, it is possible to specify an arbitrary printing grade by operating a black triangular mark on a slide bar 2211 or by directly inputting a numerical value into an input box 2212. Here, the above-described four levels, i.e., "High speed", "Standard", "High grade", and "Highest grade" are associated with numerical values 1 to 4, respectively, and thereby, it is made possible to set a value that exceeds "4" or a value that falls below "1" (e.g., 4.5, 0.8, and so on). By this value, the number of passes and the scan speed at the time of printing processing change continuously. Specifically, the larger the value specified in the "Printing grade" field, the larger the number of passes becomes and the slower the scan speed becomes. In the case where the number of passes changes, the number of nozzles capable of ejection in the same area changes and the ink amount (ink total amount limit) that can be ejected per unit area changes. That is, the larger the number of passes, the larger the number of nozzles capable of ejection in the same area is, and the more ink is ejected per unit area. For example, in the case where an image is formed by two passes, it is possible to eject the ink amount twice that in the case where an image is formed by one pass. In the case where a predetermined ink amount is divided and ejected by the first pass and the second pass, a time difference arises between the first pass and the second pass. Consequently, also in the case where the limit amount of ink that a sheet can absorb is taken into consideration, the larger the number of passes, the more ink can be ejected per unit area. Further, in the case where the scan speed becomes slow, a larger time difference arises between ejections by passes. Consequently, in the case where the limit amount of ink that a sheet can absorb is taken into consideration, the slower the scan speed, the more ink can be ejected per unit area.

In the case where an image is formed by an ink amount exceeding the ink total amount limit, a sheet cannot absorb the ink, and therefore, there is a possibility that trouble occurs, such as that the ink overflows, the ink blurs a character, the uniform single color surface becomes uneven, and the color balance collapses. On the other hand, in the case where an image is formed by an ink amount less than the ink total amount limit, the ink whose density is relatively high is used with priority and there is a possibility that granularity deteriorates. Alternatively, a sufficient ink amount cannot be secured, and therefore, there is a possibility that the desired saturation or density cannot be obtained. Consequently, it is necessary to perform the color conversion processing by using an appropriate color conversion LUT in accordance with the value of the set ink total amount limit.

Because of this, in the present embodiment, in the case where the value specified in the "Printing grade" field 2210 is large, the ink total amount limit is relaxed and the color conversion processing is performed so that an image is formed by a more ink amount. In this manner, a color conversion LUT whose ink total amount limit is changed adaptively in accordance with the value specified in the "Printing grade" field 2210 is created.

<Detailed Setting Relating to "Sheet Setting">

Next, in the "Sheet setting" field 2220, it is possible to set conditions for printing by performing color conversion processing appropriate to a sheet whose characteristics are unknown or a special sheet. A user who desires to perform color conversion processing appropriate to a sheet whose characteristics are unknown selects a radio button 2221 of "Customize sheet" within the "Sheet setting" field 2210 and further presses down a "Create characteristics" button 2222 in the state where the sheet is set to the image forming apparatus 200. In the case where the "Create characteristics" button 2222 is pressed down, in the image forming apparatus 200, a predetermined patch image is formed on the sheet and output. Here, there are two kinds of predetermined patch image: a patch image to acquire an ink total amount limit of a sheet and a patch image to acquire virtual color material equivalent amounts of each ink.

First, as the patch image capable of acquiring an ink total amount limit, an image is considered in which a plurality of patches whose ink total amount differs stepwise is put side by side. Then, by forming the patch image on a sheet and selecting a patch in which the ink does not overflow and unevenness does not occur, an ink total amount limit is acquired. As the patch image capable of acquiring virtual color material equivalent amounts of each ink, an image is considered in which patches each including a predetermined ejected amount of each ink are put side by side. By forming the patch image on a sheet, virtual color material equivalent amounts of each ink are acquired. Specifically, in accordance with step 902 in the flow in FIG. 9 of the first embodiment, the virtual color material amounts $Vyi\_x$, $Vmi\_x$, and $Vci\_x$ in the case where the ink x as an actual color material is represented by equivalent virtual color materials are acquired. The ink total amount limit and the virtual color material equivalent amounts thus acquired are saved in a memory, not shown schematically, in association with the target sheet. Then, in the case of using the sheet for the subsequent printing, the user presses down a "Select sheet" button 2223 to call the saved ink total amount limit and virtual color material equivalent amounts described above, and creates a new color conversion LUT.

<Detailed Setting Relating to "Ink Reduction Etc.">

Figure 23A:
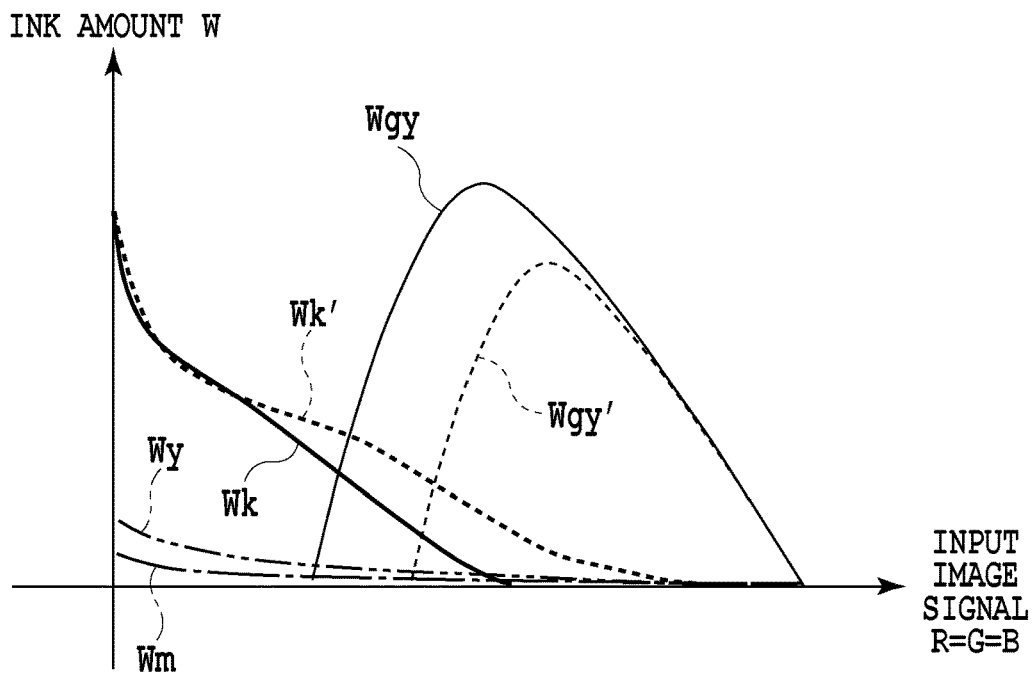
FIG. 23A and FIG. 23B are each a diagram showing an example of a color conversion LUT that is newly created in accordance with a printing setting.

In the "Ink reduction etc." field 2230, it is possible to specify a reduction in the ink amount to be used and improvement of sharpness of edge. First, by operating a black triangular mark on a slide bar 2231 with a mouse or the like, or by directly inputting a numerical value into an input box 2232, it is possible to specify an arbitrary ink reduction amount. Here, as an ink reduction amount, "12" is specified. In the case where a user specifies a reduction in ink, the ink total amount limit is determined so that the ink total amount is limited to a smaller amount. That is, in accordance with the ink reduction amount specified by a user, a color conversion LUT in which the total amount of each ink to be used is reduced is created. In this case, a reduction amount of "0" means that the ink amount is not reduced in the least and a reduction amount of "100" means that the ink amount is reduced to the maximum that is allowed. The maximum reduction amount that is allowed is determined in advance by taking into consideration whether an object included in a printing-target image can be recognized without any problem. FIG. 23A is a diagram showing an example of a color conversion LUT that is created in the case where the specified value of the ink reduction amount is "12", and showing the ink amount of each ink on the gray line (R=G=B=0 to 255) connecting W (R=G=B=255) and K (R=G=B=0). Then, the thick solid line indicates the amount of black ink before the ink reduction is performed and the thick broken line indicates the amount of black ink in the case where the ink reduction is performed with the specified value of "12". Similarly, the thin solid line indicates the amount of gray ink before the ink reduction is performed and the thin broken line indicates the amount of gray ink in the case where the ink reduction is performed with the specified value of "12". It is known that, in the color conversion after the ink reduction indicated by the broken lines, the amount of used gray ink is reduced but the amount of used black ink whose hue is the same and whose density is high is increased. The amount of ink that is necessary to reproduce the same virtual color material amount is smaller in the case of the black ink, and therefore, from a comparison between the total use amounts of all inks, it is possible to implement the same virtual color material amount with a smaller amount of ink by the color conversion after the ink reduction indicated by the broken lines.

Figure 23B:
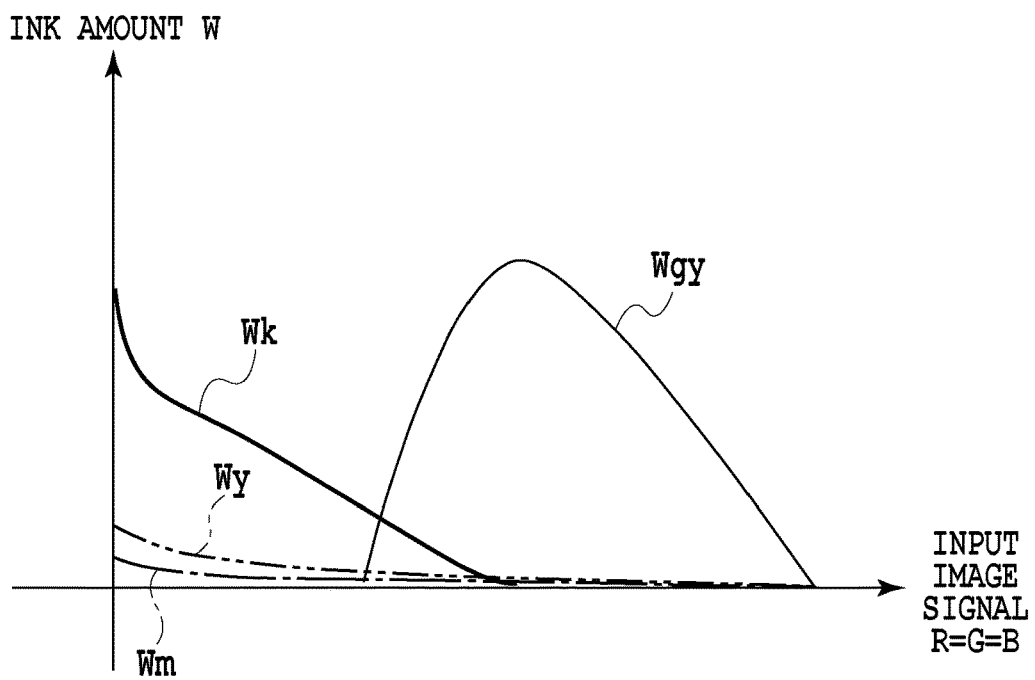

Further, in the case where a "Permit change of color" checkbox 2233 is checked, a color conversion LUT in which the amounts of ink to be used including the ink amounts for the eight primary points are reduced in accordance with a specified ink reduction amount is created. FIG. 23B is a diagram showing an example of a color conversion LUT that is created in the case where the "Permit change of color" is checked. By a comparison with the state before the ink reduction in FIG. 23A, it is known that the ink amount of each ink for R=G=B=0 is reduced.

Further, in the case where an "Increase number of sheets to be printed" checkbox 2234 is checked, a use ratio between inks that exhibit the same hue but whose densities are different is determined so that each ink is used up at the same time while referring to the remaining amount of each ink. Then, the color conversion processing is performed so that the determined use ratio and the ratio between the ink remaining amounts coincide with each other as much as possible. Due to this, it is suppressed that only a specific ink is used prominently. Further, even in the case where the remaining amount of a specific ink is almost zero, on a condition that the remaining amount of the other ink that exhibits the same hue is sufficient, it is possible to continue the printing processing and compared to the case where this function is not made use of, the number of sheets to be printed increases. In the case where a "Specify number of sheets to be printed" checkbox 2235 is checked, the color conversion processing is performed so that the printing processing of the number of sheets specified in an input box 2236 can be performed by the same printing setting. Specifically, the total amount of ink to be used and the remaining amount of each ink are compared and processing to replace an ink that is short with a combination of other inks. Due to this, the possibility that the number of sheets to be printed desired by a user can be output with limited inks becomes strong.

In the case where an "Improve edge sharpness" checkbox 2237 is checked, in the color conversion processing, the edge amount of each pixel in the printing-target image is referred to and processing to perform adjustment so that the larger the edge amount, the larger the amount of dark-color ink becomes. Due to this, the color conversion processing by a smaller amount of pale-color ink and a larger amount of dark-color ink is performed at the edge portion of the printing-target image compared to a flat portion, and therefore, it is possible to obtain an output image whose sharpness is high at the edge portion.

As above, in the case where detailed printing conditions are specified in the "Detailed setting" tab, a color conversion LUT in accordance with the specified contents is created based on the virtual color material amount LUT. However, in this case, the processing time to create a new color conversion LUT is necessary. Consequently, it may also be possible to impose restrictions on the various settings within the above-described "Detailed setting" tab so that the detailed settings can be performed only in the case where the checkbox 2201 to make the detailed settings effective is checked. Further, it may also be possible to give a warning by displaying a message and the like indicating that the processing time is taken to create a new color conversion LUT in the case where the checkbox 2201 is checked.

(Flow of Color Conversion Processing of the Present Embodiment)

Figure 24:
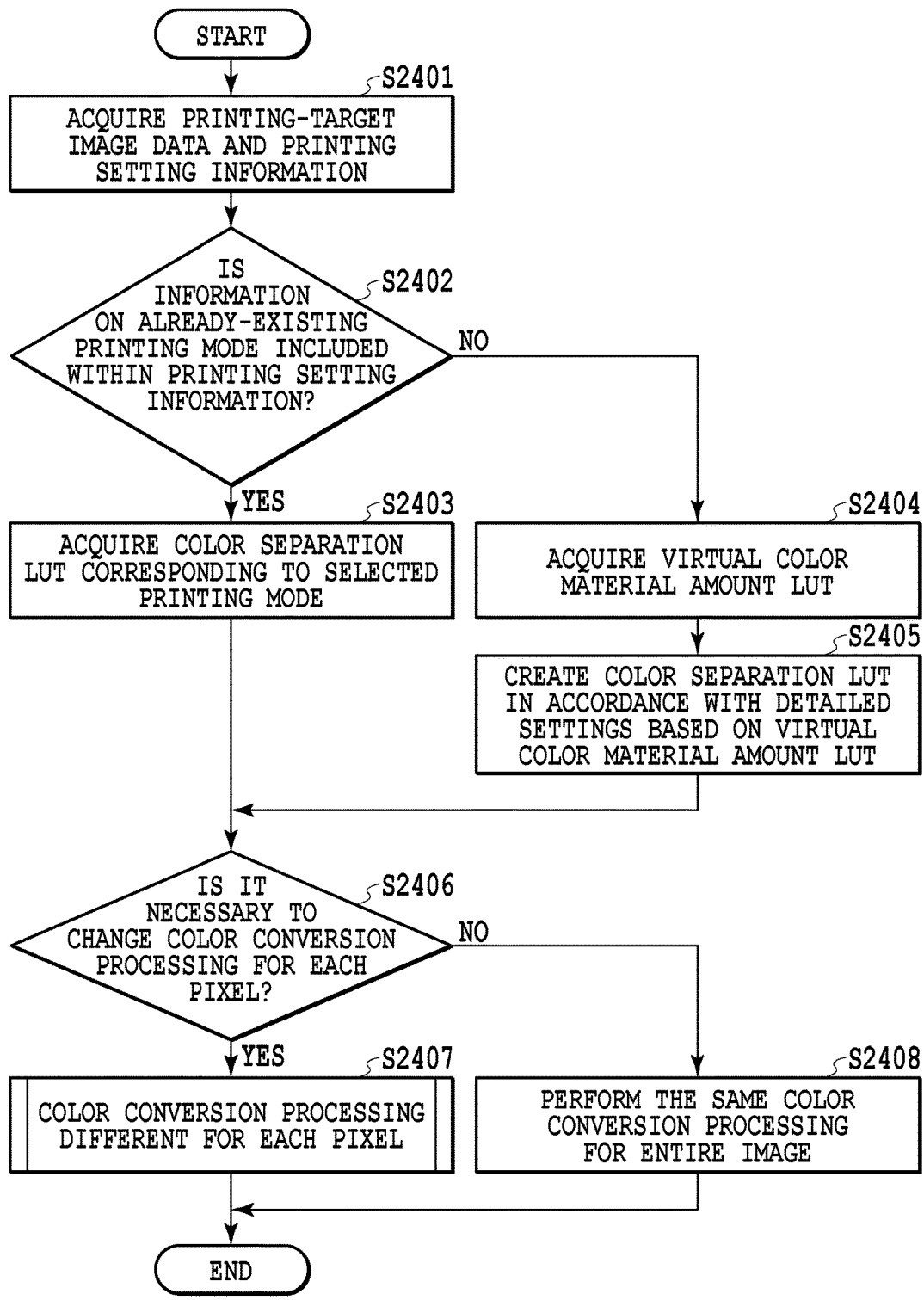
FIG. 24 is a flowchart showing a flow of color conversion processing according to the second embodiment.
Figures 25A, 25B, 25C, 25D, 25E, 25F, 25G, 25H:
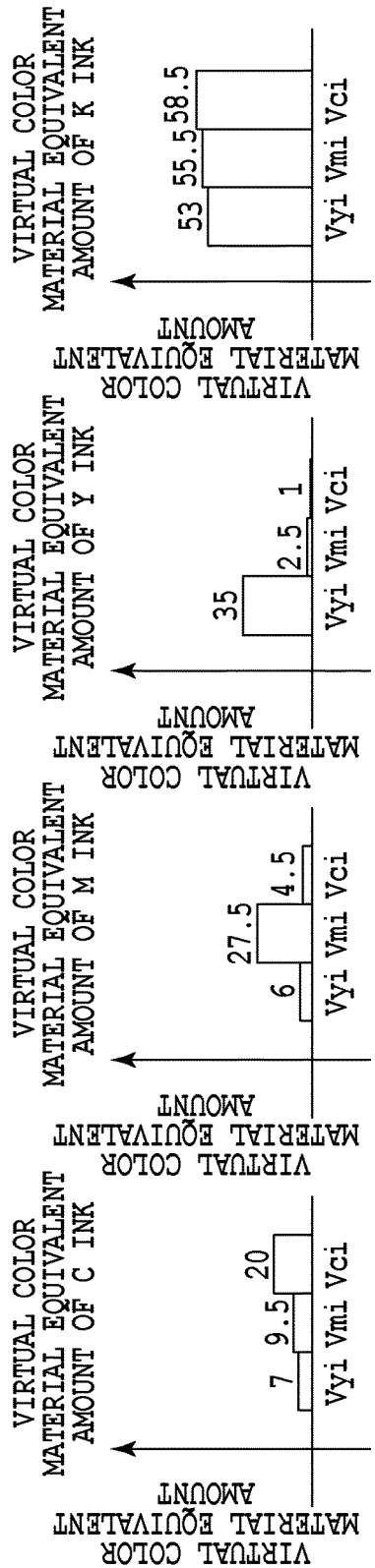
FIG. 25A to FIG. 25H are each a diagram showing an example of a virtual color material amount for each ink set in accordance with a specific sheet.

FIG. 24 is a flowchart showing a flow of the color conversion processing according to the present embodiment. The series of processing described below is also implemented by the printer driver installed in the image processing apparatus 100.

First, at step 2401, information (printing setting information) on printing-target image data (RGB image data for which color matching processing has been performed) and the printing mode and detailed settings to be applied to the image data performed via the above-described Printing setting screen 2200 is acquired.

Next, at step 2402, whether or not information indicating that one of the already-existing printing modes is selected is included within the acquired printing setting information is determined. In the case of the present embodiment, for the already-existing printing modes, the color conversion LUTs 111a to 111d corresponding to each printing mode exist. Because of this, the determination at this step is the same as the determination of whether a color conversion LUT in accordance with the contents of the acquired printing setting information exists. In the case where the results of the determination indicate that information indicating that one of the already-existing printing modes is selected is included in the printing setting information, the processing advances to step 2403. On the other hand, in the case where information indicating that one of the already-existing printing modes is selected is not included in the printing setting information (i.e., in the case where information on detailed settings specifying more detailed printing conditions from the "Detailed setting" tab is included), the processing advances to step 2404.

At step 2403, the color conversion LUT corresponding to the selected printing mode is acquired from the color conversion LUTs 111a to 111d prepared and stored in advance. On the other hand, at step 2404, in order to create a color conversion LUT in accordance with more detailed conditions specified by the detailed setting information, the virtual color material amount LUT 2101 specifying a correspondence relationship between the input image signal and the virtual color material amount is acquired. Further, at step 2405 that follows, a new color conversion LUT in accordance with the more detailed printing conditions specified by the detailed setting information is created based on the acquired virtual color material amount LUT. The method of creating a new color conversion LUT will be described later.

At step 2406, whether it is necessary to change the contents of the color conversion processing to be applied to the printing-target image data for each pixel is determined. For example, in the case where "Improve edge sharpness" described previously is specified, it is necessary to change the use ratio between inks that exhibit the same hue but whose densities are different based on the edge amount for each pixel while maintaining the relationship between the input image signal and the virtual color material amount. In the case such as this where it is necessary to change the contents of the color conversion processing for each pixel, the processing advances to step 2407. On the other hand, in the case where it is not necessary to change the contents of the color conversion processing for each pixel, the processing advances to step 2408.

At step 2407, based on the color conversion LUT acquired at step 2403 or the color conversion LUT created newly at step 2405, the color conversion processing in which the contents of the color conversion processing are changed adaptively for each pixel is performed for the printing-target image data. Details of the color conversion processing to adaptively change the contents of the color conversion processing for each pixel will be described later.

Further, at step 2408, based on the color conversion LUT acquired at step 2403 or the color conversion LUT created newly at step 2405, the color conversion processing common to all the pixels (the same contents for the entire image) is performed for the printing-target image data. The color conversion processing here is quite the same as the color conversion processing described in the first embodiment, and therefore, details of the processing are omitted in the present embodiment.

(Creation Processing of Color Conversion LUT in Accordance with Detailed Settings)

Next, details of new color conversion LUT creation processing in accordance with detailed settings at step 2405 described above are explained. As described previously, at the time of creating a new color conversion LUT, by maintaining the relationship (that increases monotonically and causes no inflection point to occur or whose number of inflection points is as small as possible) between the input image signal and the virtual color material amount, it is made possible to obtain the ink amount corresponding to the detailed specification of a user while keeping smooth gradation. Specifically, the ink amount corresponding to each input image signal is acquired by converting the virtual color material amount corresponding to each input image signal in the virtual color material amount LUT acquired at step 2404 into the output value (ink amount) of the ink used in the image forming apparatus 200. Then, by associating the obtained ink amount with each input image signal again, a new color conversion LUT is created.

For the conversion here, for example, linear combination of the virtual color material amounts is used. For example, each amount of the cyan, magenta, yellow, and black inks (Wc, Wm, Wy, Wk) as the actual color materials is found by expression (8-1) to expression (8-4) below.

$$Wy = ay\_y \times Vyi + am\_y \times Vmi + ac\_y \times Vci + aw\_y \times V\_{max} \quad \text{expression (8-1)}$$

$$Wm = ay\_m \times Vyi + am\_m \times Vmi + ac\_m \times Vci + aw\_m \times V\_{max} \quad \text{expression (8-2)}$$

$$Wc = ay\_c \times Vyi + am\_c \times Vmi + ac\_c \times Vci + aw\_c \times V\_{max} \quad \text{expression (8-3)}$$

$$Wk = ay\_k \times Vyi + am\_k \times Vmi + ac\_k \times Vci + aw\_k \times V\_{max} \quad \text{expression (8-4)}$$

In expression (8-1) described above, ay_y, am_y, and ac_y are constants representing the weight of the yellow ink for the virtual color material amounts Vyi, Vmi, and Vci, respectively. Further, W_max represents the ink total amount limit and aw_y is a constant representing the weight of the ink total amount limit for the yellow ink. This is also the same with other expression (8-2) to expression (8-4). Here, a calculation method of each weight in expression (8-1) to expression (8-4) described above is explained.

First, in the case where expression (8-1) to expression (8-4) described above are expressed in the form of a vector, expression (8') below is obtained.

$$W = a \times V \quad \text{expression (8')}$$

Here, in expression (8') described above, W, a, and V are as follows.

$$Wy$$

$$W = Wm$$

$$Wc$$

$$Wk$$

$$ay\_y \ am\_y \ ac\_y \ aw\_y$$

$$a = ay\_m \ am\_m \ ac\_m \ aw\_m$$

$$ay\_c \ am\_c \ ac\_c \ aw\_c$$

$$ay\_k \ am\_k \ ac\_k \ aw\_k$$

$$Vyi$$

$$V = Vmi$$

$$Vci$$

$$W\_{max}$$

At this time, in the case where the inverse matrix of a is taken to be $a^{-1}$, expression (8') described above is transformed into expression (8'') below.

$$V = a^{-1} \times W \quad \text{expression (8'')}$$

Then, in the case where $a^{-1}$ is taken to be $$a11 \ a12 \ a13 \ a14$$

$$a^{-1} = a21 \ a22 \ a23 \ a24$$

$$a31 \ a32 \ a33 \ a34$$

$$a41 \ a42 \ a43 \ a44$$

expression (8'') described above can be expressed as follows.

$$Vyi = a11 \times Wy + a12 \times Wm + a13 \times Wc + a14 \times Wk \quad \text{expression (8-1'')}$$

$$Vmi = a21 \times Wy + a22 \times Wm + a23 \times Wc + a24 \times Wk \quad \text{expression (8-2'')}$$

$$Vci = a31 \times Wy + a32 \times Wm + a33 \times Wc + a34 \times Wk \quad \text{expression (8-3'')}$$

$$W\_{max} = a41 \times Wy + a42 \times Wm + a43 \times Wc + a44 \times Wk \quad \text{expression (8-4'')}$$

Here, in the case where attention is focused on expression (8-1'') described above, a11 to a14 are weights of Wy to Wk for Vyi, respectively. That is, as a11 to a14, it is possible to use the virtual color material equivalent amounts shown in FIGS. 25A to 25H. Here, in the case of following FIG. 25A to FIG. 25D, a11=Vyi_y=35.0, a12=Vyi_m=6.0, a13=Vyi_c=7.0, and a14=Vyi_k=53.0 are obtained. Similarly, in the case where attention is focused on expression (8-2'') and expression (8-3'') described above, a21=Vmi_y, a22=Vmi_m, a23=Vmi_c, a24=Vmi_k, a31=Vyi_y, a32=Vyi_m, a33=Vyi_c, and a34=Vyi_k are obtained. Further, in the case where attention is focused on expression (8-4'') described above, although the left side is W_max and the right side is the weighted sum of Wy to Wk, W_max is the total sum of Wy to Wk, and therefore, a41=1.0, a42=1.0, a43=1.0, and a44=1.0 are obtained.

That is, $$Vci\_y \ Vci\_m \ Vci\_c \ Vci\_k$$

$$a^{-1} = Vmi\_y \ Vmi\_m \ Vmi\_c \ Vmi\_k$$

Vyi_y Vyi_m Vyi_c Vyi_k 1.0 1.0 1.0 1.0 is obtained, and therefore, it is possible to obtain the matrix a, i.e., the weights (ay_c to aw_k) by finding the inverse matrix of $a^{-1}$.

Then, by uniformly scaling the weights within expression (8-1) to expression (8-4) described above in accordance with the value of the ink total amount limit W_max corresponding to "Printing grade", "Sheet setting", and "Ink reduction etc." described above, it is possible to find the ink amount in accordance with the value of the ink total amount limit W_max.

For example, in the case where "By-far highest grade (4 or more)" and "Higher speed (1 or less)" are specified in "Printing grade", it is sufficient to scale the weights as follows.

First, it is assumed that an ink total amount limit W_max' in "By-far highest grade (4 or more)" is 1.2 times the ink total amount limit W_max in "Highest grade" (i.e., W_max'/W_max=1.2). At this time, the weight constant in expressions (8-1) to (8-4) described above in "By-far highest grade (4 or more)" is taken to be 1.2 times the weight in "Highest grade". That is, in the case where the weight ay_c of the cyan ink for the virtual color material amount Vyi in "Highest grade" is, for example, 1.0, a weight ay_c' of the cyan ink for the virtual color material amount Vyi in "By-far highest grade (4 or more)" will be 1.0×1.2=1.2. Similarly, in the case where an ink total amount limit W_max" in "Higher speed (1 or less)" is 0.6 times the ink total amount limit W_max in "High speed", it is sufficient to obtain the weight in expression (8-1) to expression (8-4) described above by multiplying the weight in "High speed" by 0.6. As a result of this, the virtual color material amount corresponding to the input image signal value specified in advance is converted into the output value of each ink whose total amount is different in accordance with the specified setting contents. Further, in the case where the image forming apparatus 200 includes inks that exhibit the same hue but whose densities are different (e.g., the cyan ink and the light cyan ink), as will be described later, the control to determine the output value of each ink is performed so that the smaller the value of the ink total amount limit W_max, the more dark-color ink is used. Specifically, the output value of each ink is determined so that in the case where Sum_W1<Sum_W2, D1≥D2 holds, where D1 is the dark-color ink amount in the case where the ink total amount is Sum_W1 is and D2 is the dark-color ink amount in the case where the ink total amount is Sum_W2.

Further, in the case where a specific sheet is set in "Sheet setting", by changing each weight based on the virtual color material equivalent amount of each ink saved at the time of setting, it is possible to find the ink amount in accordance with the characteristics of the specific sheet. Here, it is assumed that the virtual color material amounts for each of the cyan, magenta, yellow, and black inks set in correspondence to the specific sheet are the values shown in FIG. 25A to FIG. 25D, respectively. At this time, each weight in expression (8-1) to expression (8-4) described above will be as follows. In this case, it is assumed that the ink total amount limit is 250[%]. However, in the case where the ink amount W becomes less than 0, i.e., the ink amount W<0 as the results of the calculation, W is set 0, i.e., W=0.

ay_y,am_y,ac_y,aw_y:0.023,−0.011,−0.014,0.231 ay_m,am_m,ac_m,aw_m:−0.010,0.032,−0.027,0.295 ay_c,am_c,ac_c,aw_c:−0.021,−0.029,0.033,0.761 ay_k,am_k,ac_k,aw_k:0.007,0.007,0.008,−0.287

Similarly, it is assumed that the virtual color material amounts for each of the cyan, magenta, yellow, and black inks set in correspondence to the specific sheet are the values shown in FIG. 25E to FIG. 25H, respectively. At this time, each weight in expression (8-1) to expression (8-4) described above will be as follows. In this case, it is assumed that the ink total amount limit is 250[%].

ay_y,am_y,ac_y,aw_y:0.022,−0.012,−0.024,0.421 ay_m,am_m,ac_m,aw_m:−0.010,0.031,−0.032,0.253 ay_c,am_c,ac_c,aw_c:−0.030,−0.029,0.032,0.892 ay_k,am_k,ac_k,aw_k:0.018,0.010,0.024,−0.565

As described above, by changing each weight based on the virtual color material amount of each ink saved at the time of setting of the specific sheet, it is possible to find the ink amount in accordance with the characteristics of the specific sheet. Further, it may also be possible to acquire information on the priority of ink conversion and to convert the virtual color material amount into the ink amount based on the priority (see step 903 to step 906 in the flow in FIG. 9 of the first embodiment).

As above, a new color conversion LUT in accordance with detailed settings is created.

(Color Conversion Processing Different for Each Pixel)

Following the above, the color conversion processing to adaptively change contents for each pixel for the printing-target image data is explained. In the present embodiment, while the relationship between the input image signal and the virtual color material amount is kept, the use ratio between different inks having the same hue (e.g., dark-color ink and pale-color ink) is changed for each pixel. By doing so, it is possible to obtain the ink amount corresponding to the input image signal while keeping smooth gradation for each pixel. The case where the contents of the color conversion processing are changed adaptively for each pixel corresponds to the case where "Increase number of sheets to be printed" or "Improve edge sharpness" described previously is specified. In the following, detailed explanation is given.

<Case where "Increase Number of Sheets to be Printed" is Specified>

First, the case where "Increase number of sheets to be printed" is specified by a user is explained. This is made use of as measures in the case where the remaining amount of the ink used in the image forming apparatus 200 is smaller than the ink amount corresponding to an input image signal specified in a color conversion LUT and a printout cannot be produced. Specifically, each remaining amount of the different inks that exhibit the same hue and which are used in the image forming apparatus 200 is found for each pixel and for example, the use ratio between the dark-color ink and the pale-color ink is changed based on the ratio between the remaining amounts. At this time, the ink amounts that do not change the virtual color material equivalent amount before and after the change of the use ratio and which are in accordance with the use ratio between the dark-color ink and the pale-color ink are determined. Due to this, for example, in the case where the remaining amount of the gray ink is almost zero but the remaining amount of the black ink is large, the color conversion processing is enabled in which the black ink is used as much as possible, and therefore, it is possible to obtain printing results with substantially the same coloring. Then, compared with the case where "Increase number of sheets to be printed" is not specified, the different inks having the same hue are used so that the inks are used up simultaneously, and therefore, number of sheets to be printed is increased. It is possible to derive the ink remaining amount based on, for example, the volume or weight of the ink remaining in each ink tank, or the accumulated number of output dots of each ink. Further, the basic information at the time of finding the ink remaining amount may be an absolute value for each ink or a relative value, such as the ratio of the remaining amount between one ink and another ink.

Figure 26:
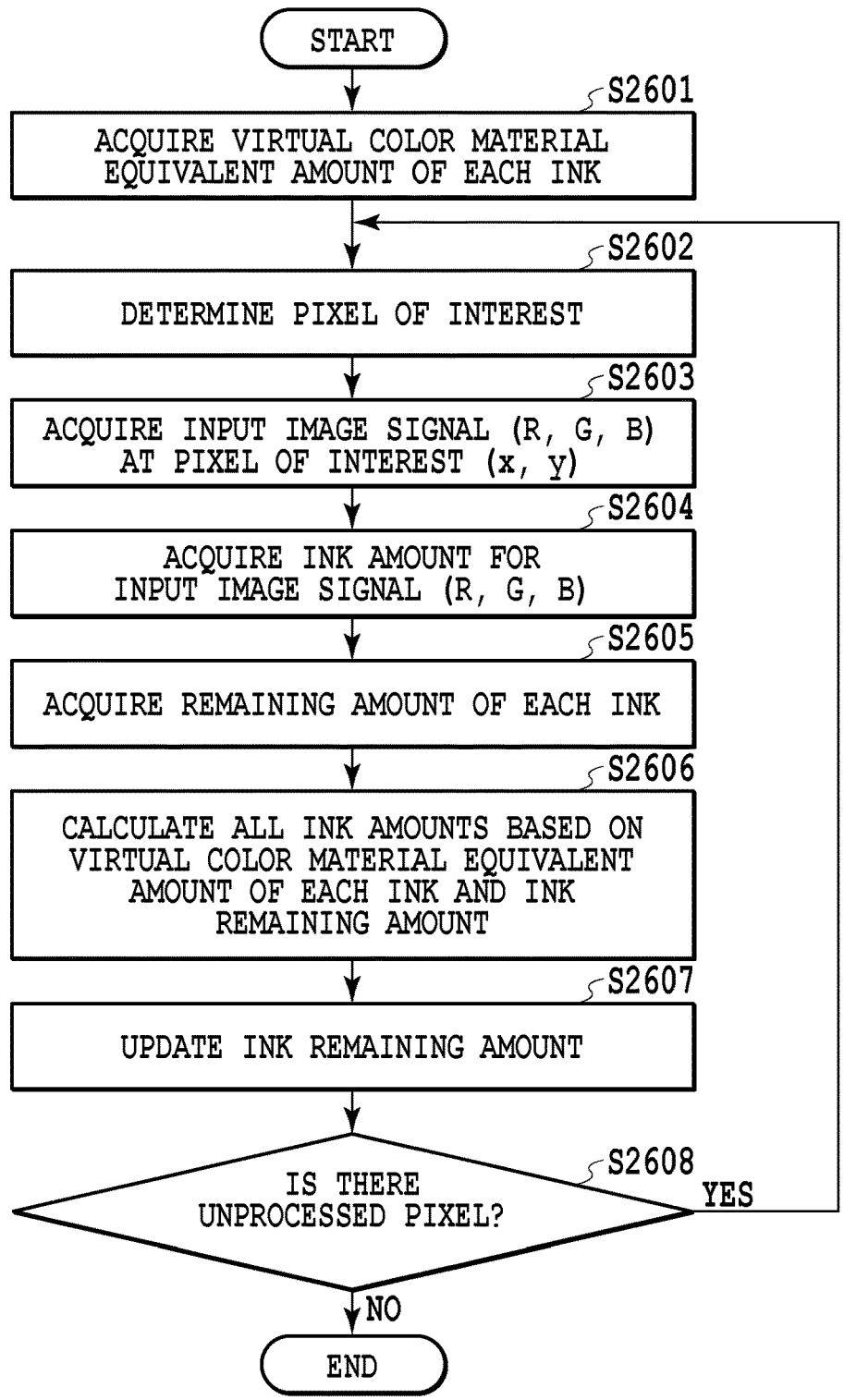
FIG. 26 is a flowchart showing details of color conversion processing to adaptively change contents for each pixel.

FIG. 26 is a flowchart showing details of the color conversion processing to adaptively change the contents for each pixel in the case where "Increase number of sheets to be printed" is specified.

At step 2601, the virtual color material equivalent amount of each ink is acquired. This step is the same as step 902 in the flow in FIG. 9 of the first embodiment.

Next, at step 2602, a pixel of interest that is a target of the color conversion processing is determined. At this time, by taking a position (x, y) of the first pixel of interest to be, for example, (0, 0) and then by sequentially updating the pixel position (x, y), the color conversion processing for all the pixels within the printing-target image data is performed. It is sufficient to update the pixel position by, for example, setting x=x+1, and then setting x=0 and y=y+1 in the case where x after updating becomes larger than the transverse width of the input image.

At step 2603, an input image signal (R, G, B) at the pixel of interest (x, y) is acquired. At step 2604 that follows, by referring to the color conversion LUT acquired at step 2403 in the flow in FIG. 24 described previously or the color conversion LUT created at step 2405, the output value (ink amount) of each ink corresponding to the input image signal (R, G, B) is acquired.

Next, at step 2605, the remaining amount of each ink is acquired. Specifically, the amount of the ink remaining in each ink tank (not shown schematically) included in the image forming apparatus 200 is acquired for each ink. At this time, it may also be possible to take into consideration a spare ink tank a user presents as an exchangeable one and the number of spare ink tanks, in addition to the inks used in the image forming apparatus 200.

Then, at step 2606, based on the virtual color material equivalent amount of each ink acquired at step 2601 and each ink remaining amount acquired at step 2605, the output value (ink amount) for each ink corresponding to the input image signal (R, G, B) of the pixel of interest (x, y) is determined. Specifically, each ink amount is determined so that the ratio of the remaining amount between the different inks having the same hue and the use ratio become equal while maintaining the virtual color material amount for the input image signal (R, G, B).

Here, explanation is given by taking the case as an example where a black ink and a gray ink, both are achromatic, are included. In the following explanation, it is assumed that the remaining amount of the black ink is represented by Ak and the remaining amount of the gray ink is represented by Agy. Further, it is also assumed that the ink amount corresponding to the input image signal of the black ink is represented by Wk and that of the gray ink is represented by Wgy. Furthermore, it is also assumed that the ink amount that is finally found of the black ink is represented by Wk' and that of the gray ink is represented by Wgy'. In this case, as described previously, the ink amounts are determined so that the total sum of the virtual color material equivalent amounts do not change before and after the change. Here, the virtual color material equivalent amount of the black ink before the change and the sum of the virtual color material equivalent amounts of the black ink and the gray ink after the change coincide with each other. That is, the ink amounts Wk' and Wgy' that are found finally satisfy expression (9) below.

$$Vk \times Wk + Vgy \times Wgy = Vk \times Wk' + Vgy \times Wgy' \quad \text{expression (9)}$$

In expression (9) described above, Vk is the total sum of the virtual color material equivalent amounts Vyi_k, Vmi_k, and Vci_k of the black ink and Vgy is the total sum of the virtual color material equivalent amounts Vyi_gy, Vmi_gy, and Vci_gy of the gray ink.

Further, as described previously, the ink amounts are determined so that the ratio of the remaining amount between the different inks having the same hue and the use ratio become equal. Here, Ak/Agy, which is the ratio of the remaining amount of the black ink to that of the gray ink, coincides with Wk'/Wgy', which is the use ratio of the black ink to the gray ink. That is, the ratio of the remaining amount Ak/Agy and the use ratio Wk'/Wgy' satisfy expression (10) below.

$$Ak/Agy = Wk'/Wgy' \quad \text{expression (10)}$$

Then, in the case where expression (9) and expression (10) described above are solved as to Wk' and Wgy', respectively, expression (11-1) and expression (11-2) below are obtained.

$$Wk' = Ak \times (Vk \times Wk + Vgy \times Wgy)/(Vk \times Ak + Vgy \times Agy) \quad \text{(expression 11-1)}$$

$$Wgy' = Agy \times (Vk \times Wk + Vgy \times Wgy)/(Vk \times Ak + Vgy \times Agy) \quad \text{(expression 11-2)}$$

Here, the black ink remaining amount Ak=0.5 [ml] and the gray ink remaining amount Agy=0.4 [ml] are acquired at step 2605 described previously and in the case where it is assumed that the total sum of black ink Vk=58 and the total sum of gray ink Vgy=17, Wk' and Wgy' will be as follows. First, it is assumed that the black ink amount Wk=51[%], the gray ink amount Wgy=144[%], and the ink amount 0[%] for the other inks corresponding to the RGB value (25, 25, 25) of the input image signal are acquired at step 2604. Then, it is assumed that the black ink remaining amount Ak=0.5 [ml] and the gray ink remaining amount Agy=0.4 [ml] are acquired at step 2605. In this case, at step 2606, Wk'=75.5 and Wgy'=60.4, the ink amounts that are found finally, are obtained. That is, in the printer including both the black ink and the gray ink as achromatic inks, by expression (11-1) and expression (11-2) described above, the black ink amount Wk' and the gray ink amount Wgy' corresponding to the input image signal (R, G, B) of the pixel of interest (x, y) are determined.

After the output value of each ink corresponding to the input image signal (R, G, B) of the pixel of interest (x, y) is determined as described above, at step 2607, the remaining amount of each ink is updated. Specifically, the value obtained by subtracting the ink amount of each ink determined at step 2606 from the remaining amount of each ink acquired at step 2605 is taken to be a new ink remaining amount of each ink. In the specific example described above, in the case where the ejection amount per dot is 30 [pl]=30× 10^(−9) [ml], the black ink remaining amount Ak is updated to Ak=0.5−30×10^(−9) after updating. Due to this, it is possible to perform the color conversion processing for the remaining pixels by taking into consideration the amount of ink that is used for the pixel for which the color conversion processing has already been performed.

Then, at step 2608, whether or not the color conversion processing has been completed for all the pixels of the printing-target image data is determined. In the case where there is an unprocessed pixel, the processing returns to step 2602 and the next pixel is taken to be the pixel of interest and the processing is continued. On the other hand, in the case where the processing has been completed for all the pixels, the present processing is terminated.

The above is the contents of the color conversion processing to adaptively change the contents for each pixel in the case where "Increase number of sheets to be printed" is specified.

In the above-described example, by expression (11-1) and expression (11-2) using Vk and Vgy, which are each the total sum of the virtual color material equivalent amounts Vyi_n, Vmi_n, and Vci_n for each ink, the ink amounts corresponding to the input image signal are found. Here, it may also be possible to use the maximum value of Vyi_n, Vmi_n, and Vci_n in place of Vk and Vgy. In the case where the maximum value is used, it is sufficient to determine the ink amounts so that the virtual color material equivalent amount having the maximum value does not change before and after the processing. For example, in the case of the ink, such as the cyan, magenta, and yellow inks, the main virtual color material equivalent amount is important. Because of this, in the case where the same processing is performed for these inks, for example, in the case where the amounts of the cyan ink and the light cyan ink whose hue is the same are determined, it is desirable to use the maximum value in place of the total sum.

Further, it may also be possible to determine the ink amount of each ink so that the ink total amount limit is not exceeded by acquiring information relating to the ink total amount limit and priorities between the inks whose hue is the same.

At step 2604 described above, the ink amounts corresponding to the input image signal are acquired by referring to the color conversion LUT, but it may also be possible to acquire the ink amounts in accordance with expression (8-1) to expression (8-4) described previously or in accordance with the flow in FIG. 9 of the first embodiment after acquiring the virtual color material amount.

Further, in the present embodiment, the ratio of the remaining amount between the different inks having the same hue and the use ratio are made equal. In place of this, it may also be possible to make equal the ratio of the remaining amount and the use ratio also in a relationship with an ink having another hue based on the virtual color material amount. For example, it may also be possible to convert the red ink into the yellow ink and the magenta ink so that the virtual color material amounts Vyi and Vmi are substantially the same. Alternatively, it may also be possible to convert the black ink into each of the cyan, magenta, and yellow inks so that the virtual color material amounts Vyi, Vmi, and Vci are substantially the same. Alternatively, it may also be possible to convert the red ink into each of the cyan and magenta inks.

In the present embodiment, the color conversion processing is performed for each pixel based on the remaining amount of each ink by using the color conversion LUT created in accordance with the detailed settings. For example, it may also be possible to make equal the ratio of the remaining amount between the different inks having the same hue and the use ratio by finding the total sum of the amount of each ink to be used for the entire image and by changing the color conversion LUT based on the found total sum of the amount of each ink to be used. However, in this case, it is necessary to perform the color conversion processing again by using the changed color conversion LUT.

<Case where "Increase Number of Sheets to be Printed" is Specified and Number of Sheets to be Printed is Specified>

In the case where a user specifies a desired number of sheets to be printed, in addition to "Increase number of sheets to be printed", the color conversion processing is performed so that the specified number of sheets to be printed can be printed with the same printing settings. Specifically, at step 2405 in the flow in FIG. 24 described previously, a color conversion LUT is created by which it is possible to print the specified number of sheets to be printed with the same printing settings. In the following, detailed explanation is given. First, the amount of ink expected to be used per sheet for the printing processing is derived. Further, the total amount of ink to be used is found by multiplying the derived amount of ink to be used by the specified number of sheets to be printed. Then, a new color conversion LUT is created by comparing the found total amount of ink to be used with the remaining amount of each ink and replacing the ink that is short with a combination of other inks. For example, in the case where the cyan ink is short, on a condition that the light cyan ink whose hue is substantially the same as that of the cyan ink is included and the remaining amount of the light cyan ink is enough, the cyan ink is replaced with the light cyan ink. Further, in the case where the red ink is short, on a condition that a combination of inks (magenta and yellow) capable of the same coloring as that of the red ink is included and the remaining amounts of both the inks are enough, the red ink is replaced with the magenta and yellow inks.

In the case where it is not possible to print the specified number of sheets to be printed even by the replacement processing, it is considered to notify a user of the ink that is short and information on the number of sheets that can be output. In this case the printing processing including the color conversion processing is not performed. However, in the case where a user selects "Permit change of color", it is made possible to print the specified number of sheets to be printed by changing the ink amount of the primary point in accordance with the necessity. Specifically, the ink amount of the primary point is changed and the weight (equivalent value) of each ink amount is changed so that the virtual color material equivalent amount becomes consistent in accordance with the ink amount after the change. Then, the color conversion LUT is changed so that the specified number of sheets to be printed can be printed.

<Case where "Improve Edge Sharpness" is Specified>

Figure 27:
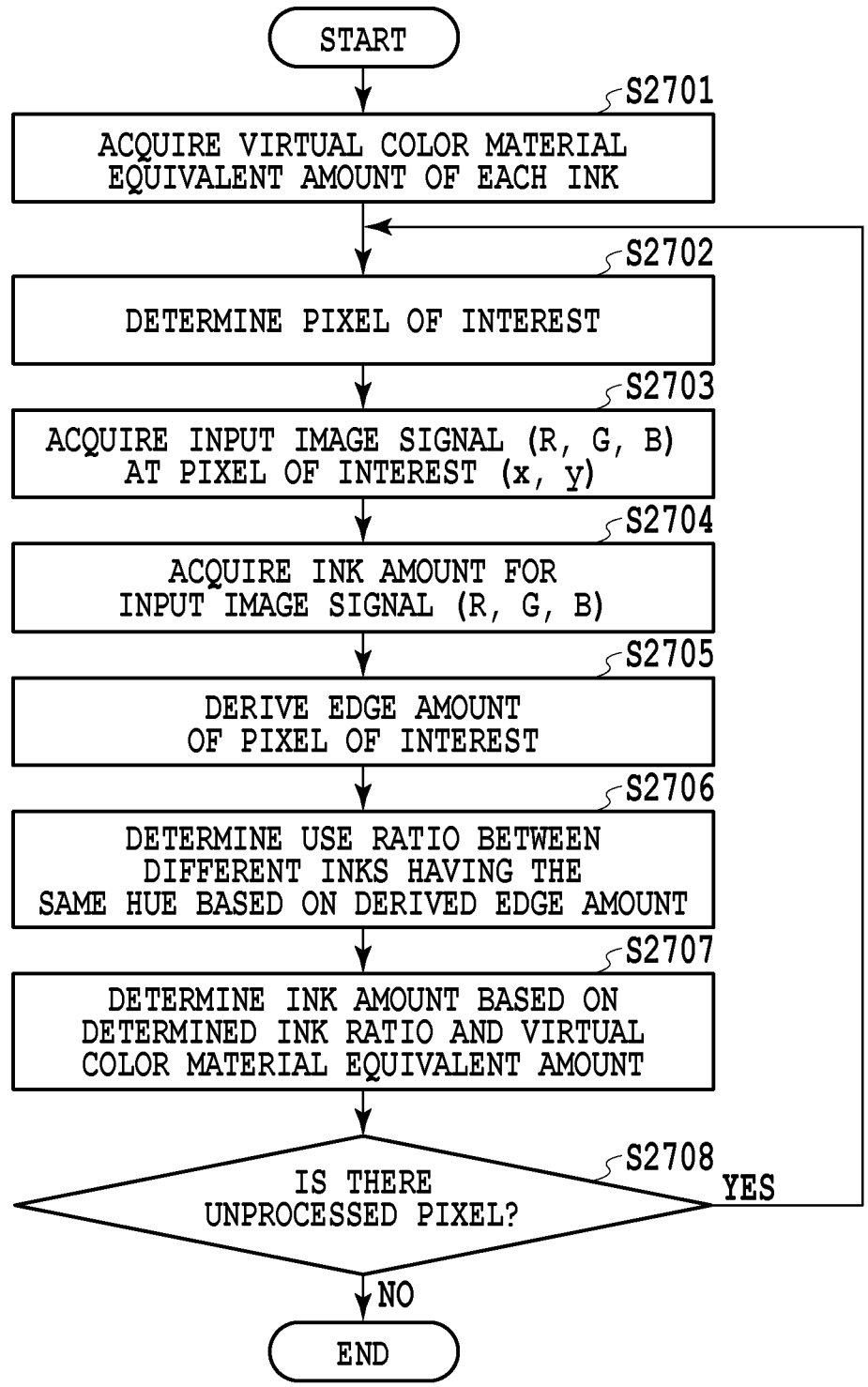
FIG. 27 is a flowchart showing details of color conversion processing to adaptively change contents for each pixel.

Next, the case where "Improve edge sharpness" is specified by a user is explained. In the case where "Improve edge sharpness" is specified, the use ratio of the different inks having the same hue is determined for each pixel based on the edge amount for each pixel in the printing-target image data. FIG. 27 is a flowchart showing details of the color conversion processing to adaptively change the contents for each pixel in the case where "Improve edge sharpness" is specified.

Step 2701 to step 2704 are the same as step 2601 to step 2604 in the flow in FIG. 26 described previously. In the case where the output value (ink amount) of each ink corresponding to the input image signal (R, G, B) is acquired by referring to the color conversion LUT at step 2704, the edge amount of the pixel of interest is derived at step 2705. Here, it is possible to find the edge amount for each pixel by using the publicly known filter processing. For example, it is sufficient to find the secondary differential amount of the pixel value of interest by using the Laplacian filter and to use the found secondary differential amount as the edge amount of the pixel of interest.

At step 2706, based on the derived edge amount, the use ratio of the different inks having the same hue is determined. At this time the use ratio is determined so that the larger the edge amount, the larger the amount of the dark-color ink becomes than that of the pale-color ink. At step 2707 that follows, based on the determined ink ratio and the virtual color material equivalent amount, the output value of each ink is determined. Specifically, as in expression (9) and expression (10) described previously, it is sufficient to find the simultaneous equations for the virtual color material amount and the use ratio and to find an ink amount W'.

Here, in the case where it is assumed that Wgy:Wk=E:1−E, a specific example is shown as follows. First, it is assumed that the black ink amount Wk=51[%], the gray ink amount Wgy=144[%], and the ink amount=0 for the other inks corresponding to the input RGB value (25, 25, 25) are acquired at step 2704. Then, it is assumed that an edge degree E=0.3 of the pixel of interest is obtained at step 2705. Here, it is assumed that the edge degree E takes a value between 0 and 1, the pixel of interest belongs to the flattest portion in the case where E=0, and the pixel of interest belongs to the portion where the degree of edge is the highest in the case where E=1.0. Next, at step 2706, the use ratio between the gray ink and the black ink based on the edge degree E=0.3 of the pixel of interest is determined. Here, Wgy':Wk'=(1−E):E=0.7:0.3 is determined as the use ratio. Then, at step 2707, from expression (12-1) and expression (12-2) below, the black ink amount Wk'=55.4[%] and the gray ink amount Wgy'=128.2[%] are found.

$$Wk'=E\times(Wk\times Vk+Wgy\times Vgy)/(E\times Vk+(1-E)\times Vgy) \quad \text{expression (12-1)}$$

$$Wgy'=(1-E)\times(Wk\times Vk+Wgy\times Vgy)/(E\times Vk+(1-E)\times Vgy) \quad \text{expression (12-2)}$$

In this example, it is assumed that Wgy:Wk=E:1−E, but another ratio, such as 1:E, may be used.

Then, at step 2708, whether or not the color conversion processing has been completed for all the pixels of the printing-target image data is determined. In the case where there is an unprocessed pixel, the processing returns to step 2702 and the next pixel is taken to be the pixel of interest and the processing is continued. On the other hand, in the case where the processing has been completed for all the pixels, the present processing is terminated.

The above is the contents of the color conversion processing to adaptively change the contents for each pixel in the case where "Improve edge sharpness" is specified.

Here, the secondary differential amount obtained by the filter processing is taken to be the edge amount, but it may also be possible to find the power of the high-frequency component from the frequency characteristics in a local area with the pixel of interest as the center and to use the power as the edge amount. That is, it may also be possible to determine the use ratio so that the larger the power of the high-frequency component, the larger the amount of the dark-color ink becomes.

Here, by taking the case where "Improve edge sharpness" is specified as an example, the aspect is explained in which the edge amount is acquired for each pixel in the printing-target image data and based on the acquired edge amount, the use ratio between the different inks having the same hue is changed. Another scene is also considered where it is effective to adaptively change the contents of the color conversion processing for each pixel. For example, in the case where the pixel of interest is part of a photo (image), it is desirable to give priority to the pale-color ink in order to suppress granularity. Further, in the case where the pixel of interest is part of a character, it is desirable to give priority to the dark-color ink by attaching importance to sharpness and ink consumption. Consequently, it may also be possible to acquire the attribute information on an object for each pixel and to change the color conversion LUT in accordance with the acquired attribute information following the method described previously.

It may also be possible to create a color conversion LUT in accordance with specified printing conditions so that the virtual color material amount in a virtual color material amount LUT is maintained by holding in advance only the virtual color material amount LUT. At this time, the virtual color material amount LUT that is held in advance is designed so that the relationship between the input image signal and the virtual color material amount increases monotonically and causes no inflection point to occur (secondary differential does not become negative). By doing so, in a color conversion LUT that is created newly also, the relationship between the input image signal and the virtual color material amount increases monotonically and causes no inflection point to occur (secondary differential does not become negative). Due to this, it is made possible to obtain a color conversion LUT having smooth gradation capable of satisfying a detained request of a user.

According to the present embodiment, based on the color conversion LUT held in advance, a color conversion LUT in accordance with a variety of requests and the like of a user is created in accordance with the necessity. Due to this, it is made possible to perform the color conversion processing in accordance with a detailed request of a user while maintaining smooth gradation.

Third Embodiment

In the second embodiment, a color conversion LUT in accordance with a detailed request of a user is created newly from the virtual color material amount LUT. Next, an aspect is explained as a third embodiment in which a new color conversion LUT is obtained by combining a plurality of color conversion LUTs. Explanation of the portions in common to those of the second embodiment is omitted and in the following, different points are described.

Figure 28:
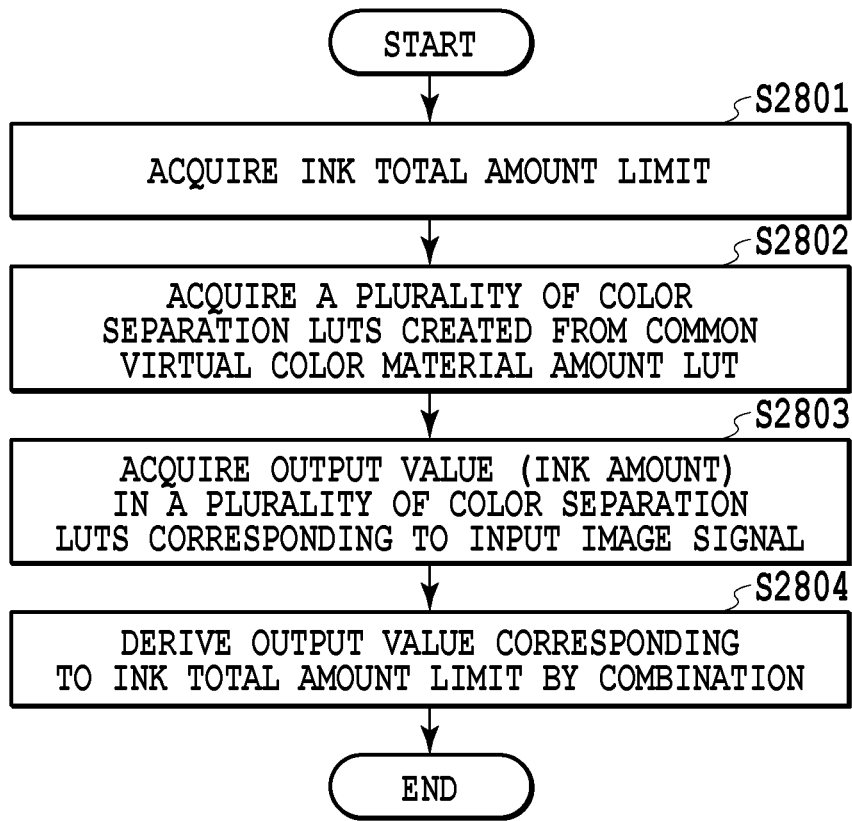
FIG. 28 is a flowchart showing details of processing to create a color conversion LUT in accordance with a printing condition specified by a user by combination of a plurality of color conversion LUTs according to a third embodiment.

FIG. 28 is a flowchart showing details of processing to create a color conversion LUT in accordance with printing conditions specified by a user by combining a plurality of color conversion LUTs according to the present embodiment. The flow before this flow is performed is the same as that of the flow in FIG. 24 according to the second embodiment. That is, in the case where the printing-target image data and printing setting information are acquired (S2401), whether or not information indicating that one of the already-existing printing modes is selected is included within the printing setting information is determined (S2402). Then, in the case where information indicating that one of the already-existing printing modes is selected is included, the color conversion LUT corresponding to the selected printing mode is acquired from the color conversion LUTs 111*a* to 111*d* prepared and held in advance (S2403). On the other hand, in the case where information on the detailed setting specifying more detailed printing conditions from the "Detailed setting" tab is included, in place of the processing at steps 2404 and 2405, the flow in FIG. 28 shown below is performed.

At step 2801, the ink total amount limit (Max_W) determined in advance is acquired. This processing is the same as that at step 904 in the flow in FIG. 9 according to the first embodiment. Here, it is assumed that the ink total amount limit Max_W=180[%] is acquired.

Figure 29A:
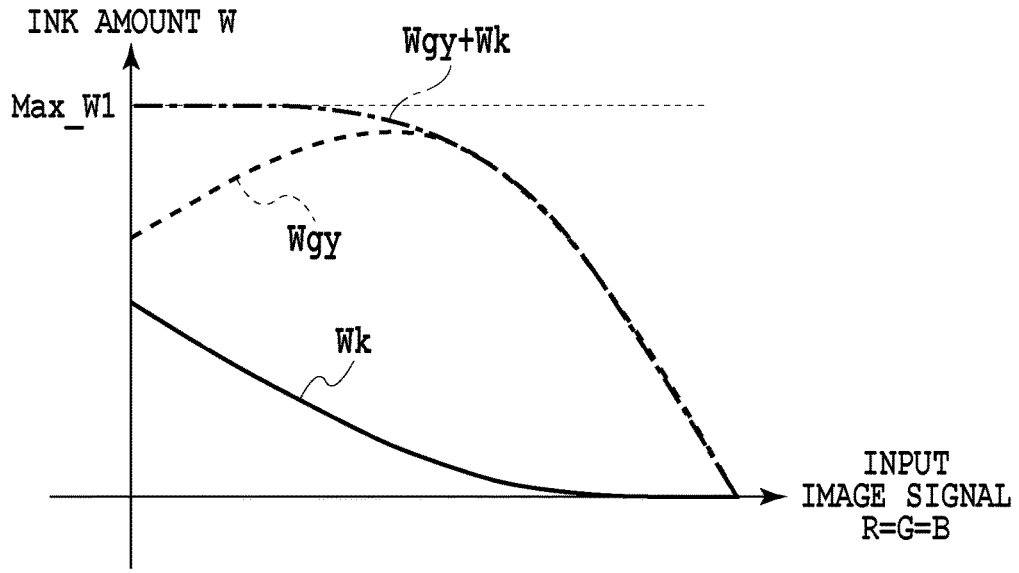
FIG. 29A and FIG. 29B are diagrams showing a black ink amount and a gray ink amount, respectively, on gray lines of two color conversion LUTs whose limits of the total amount of ink (hereinafter, ink total amount limit) are different.
Figure 29B:
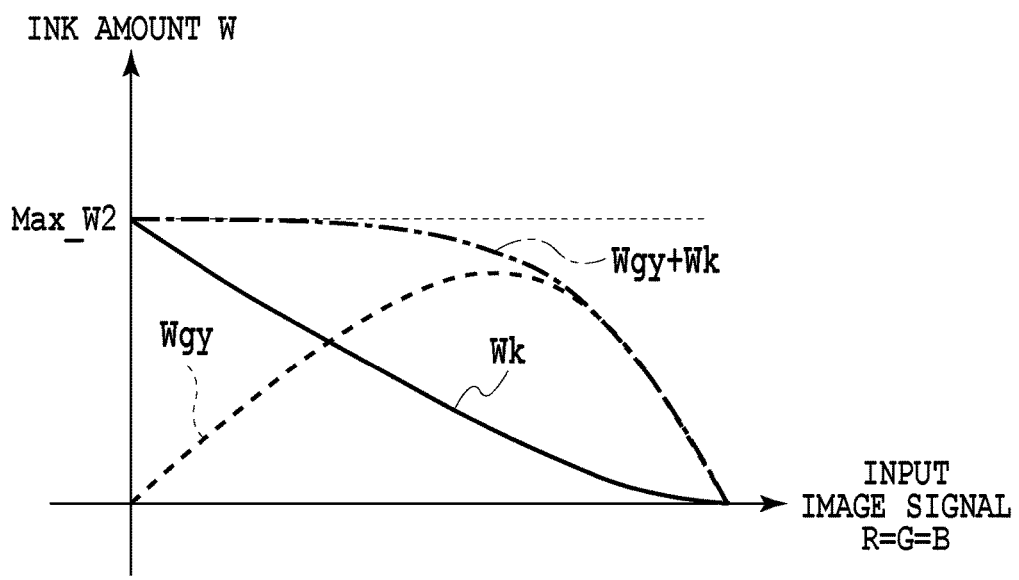

At step 2802, at least two color conversion LUTs are acquired. The color conversion LUT to be acquired at this time needs to be a color conversion LUT created from a common virtual color material amount LUT. Here, the following explanation is given on the assumption that two color conversion LUTs (LUT_w1 and LUT_w2) created based on a common virtual color material amount LUT_i are acquired. In this case, it is assumed that the ink total amount limit at the time of creating LUT_w1 is Max_W1 and the ink total amount limit at the time of creating LUT_w2 is Max_W2, and there is a relationship of Max_W1>Max_W2. FIG. 29A and FIG. 29B show the black and gray ink amounts on the gray lines (R=G=B=0 to 255) of the acquired LUT_w1 and LUT_w2, respectively. The ink total amount limit Max_W1 of LUT_w1 is 250[%] and the ink total amount limit Max_W2 of LUT_w2 is 150[%]. Then, in the present embodiment, the ink amount W corresponding to the input image signal is derived from LUT_w1 and LUT_w2 so that Max_W1 Max_W Max_W2 is satisfied. Due to this, the weight for each LUT becomes a positive value (ink amount is calculated by interpolation), and therefore, it is possible to suppress the ink amount from becoming a negative value or a value that diverges.

Next, at step 2803, the ink amount for the input image signal (R, G, B) is acquired from LUT_w1 and LUT_w2, respectively. That is, an ink amount W1 for the input image signal (R, G, B) in the case of the ink total amount limit Max_W1 is acquired by referring to LUT_w1 and similarly, an ink amount W2 for the input image (R, G, B) in the case of the ink total amount limit Max_W2 is acquired by referring to LUT_w2. Here, it is assumed that the input RGB value is (50, 50, 50) and a black ink amount W1 k=66.9 and a gray ink amount W1 gy=183.1 in LUT_w1 corresponding thereto, and a black ink amount W2 k=108.4 and a gray ink amount W2 gy=41.6 in LUT-w2 corresponding thereto are acquired.

Next, at step 2804, from the weighted sum of the acquired ink amounts W1 and W2, the ink amount W corresponding to the ink total amount limit Max_W acquired at step 2801 is derived. At this time, addition is performed so that the sum of the weighting coefficients is 1 and the virtual color material equivalent amount of the ink amount W to be derived is caused to substantially coincide with the virtual color material amount determined in LUT_i. Specifically, by expression (13) below, the ink amount W for the input image signal (R, G, B) is found.

$$W=(1-\alpha) \times W1 + \alpha \times W2 \quad \text{expression (13)}$$

In expression (13) described above, α is a constant and α=(Max_W−Max_W1)/(Max_W2−Max_W1). In the specific example described above, first, the value of α will be (180−250)/(150−250)=0.7. Then, by substituting 0.7 for a and each of the above-described values for W1 and W2 in expression (13) described above, the output values after combination that satisfy the ink total amount limit Max_W=180[%], that is, the black ink amount Wk'=96.0 and the gray ink amount Wgy'=84.0 are found. By associating the ink amount thus obtained with each input image signal again, a new color conversion LUT is created.

In expression (13) described above, α is taken to be a constant that is calculated from Max_W1 and Max_W2, but α may be a function of the input RGB value. That is, it may also be possible to cause the ink total amount limit to change between the highlight portion and the shadow portion by changing α in accordance with the input RGB value. For example, it may also be possible to relax the ink total amount limit at the highlight portion where granularity is conspicuous and to set α to a value close to 0, or to set α to a value close to 1 at the shadow portion relating to the maximum density of a printer, and so on.

In the example described above, two kinds of color conversion LUTs whose ink total amount limits are different are prepared and based on the value of each of the ink total amount limits, the weighting of each color conversion LUT is determined but this is not limited. For example, it may also be possible to prepare a plurality of color conversion LUTs whose priorities of ink conversion are different and to determine the weighting of each color conversion LUT in accordance with the requirement to which priority should be given, which a user selects at the time of output. Alternatively, it may also be possible to determine the weighting of each color conversion LUT in accordance with the remaining amount of ink.

Further, it may also be possible to find α(R, G, B) by expression (14) below using the ink total amounts Sum_W1 and Sum_W2 for the input image signal (R, G, B) in place of the ink total amount limits Max_W1 and Max_W2.

(In the case where Sum_W2≤Max_W)

$$\alpha(R,G,B)=0$$

(In the case where Sum_W2>Max_W)

$$\alpha(R,G,B)=(Max\_W-Sum\_W1)/(Sum\_W2-Sum\_W1) \quad \text{expression (14)}$$

In expression (14) described above, Sum_W1 is the total sum of the ink amounts W to be output for the input image signal (R, G, B). By following expression (14) described above, in the range of Sum_W2≤Max_W, α(R, G, B)=0, and therefore, it is possible to obtain the ink amount more excellent in granularity that that in the case where α shown in expression (13) described above is used. Further, in the case where Sum_W2>Max_W, α is set so that the ink total amount becomes equal to Max_W, and therefore, granularity is more excellent than that in the case where α shown in expression (13) described above is used.

It may also be possible to acquire LUT_w1 and LUT_w2 by creating them in accordance with step 901 to step 909 in the flow in FIG. 9 of the present embodiment. In this case, at step 901, the virtual color material amount is acquired from the same virtual color material amount LUT_i. Further, at step 907, as the ink total amount limit, Max_W1 or Max_W2 is used, respectively.

As above, in the present embodiment, the color conversion LUTs in which the input image signal and the ink amount are associated with each other are created in advance for the different ink total amount limits and the like and by combining those color conversion LUTs in accordance with the acquired ink total amount limit, the ink amount corresponding to the input image signal is derived. Then, by causing the sum of the weighting coefficients of each color conversion LUT to become 1 at the time of combination, the virtual color material amount equivalent amount of the found ink amount W is caused to substantially coincide with the virtual color material amount used at the time of creating each color conversion LUT to be prepared in advance. Due to this, the ink amount W (new color conversion LUT) that is obtained by combination will have the characteristics that change smoothly for an input image signal.

According to the present embodiment, it is possible to find the output value corresponding to an input image signal by combination using a plurality of color conversion LUTs held in advance, and therefore, it is possible to suppress the calculation amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the color conversion processing of the present invention, it is possible to obtain favorable gradation properties in the entire color space from the shadow area to the highlight area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-162854 filed Aug. 23, 2016, which is hereby incorporated by reference wherein in its entirety.

What is claimed is:

1. A color conversion processing apparatus that converts a signal value of an input image into an output value of an actual color material used in an image forming apparatus, the color conversion processing apparatus comprising:
　an acquisition unit configured to acquire a printing setting for the input image; and
　a conversion unit configured to convert the signal value of the input image into the output value of the actual color material in accordance with the acquired printing setting, wherein
　the conversion unit performs the conversion while maintaining a relationship between the signal value of the input image and output values of a virtual color material,
　the number of virtual color materials is smaller than the number of actual color materials and the respective virtual color materials have respective densities corresponding to respective wavelength bands obtained by dividing a wavelength range reproduced by the actual color materials being output into a plurality of wavelength bands,
　the output values of the plurality of virtual color materials are determined based on the respective densities corresponding to the respective wavelength bands, and
　the relationship is a relationship that increases monotonically and whose secondary differential does not become negative.

2. The color conversion processing apparatus according to claim 1, wherein
　the conversion unit calculates a weight of each of actual color materials for the output values of the plurality of virtual color materials and determines the output value of each of the actual color materials based on the calculated weight, and
　the weight of each of the actual color materials is determined based on a ratio between the output values of the plurality of virtual color materials.

3. The color conversion processing apparatus according to claim 1, wherein
　the conversion unit determines the output value of the actual color material in accordance with a total amount limit of the actual color material that can be ejected per unit area, which is different depending on the printing setting.

4. The color conversion processing apparatus according to claim 3, wherein
　in a case where the image forming apparatus uses a plurality of actual color materials having the same hue, the conversion unit determines the output value of each actual color material so that the smaller the value of the total amount limit of the actual color material, the more an actual color material, whose density is higher, of the plurality of actual color materials is used.

5. The color conversion processing apparatus according to claim 1, wherein
　in a case where a specific printing medium is specified in the printing setting, the conversion unit determines the output value of each of the actual color materials by changing the weight based on an equivalent value by the plurality of virtual color materials per unit amount of the actual color material associated with the specific printing medium.

6. The color conversion processing apparatus according to claim 1, wherein
　the conversion unit determines the output value of each of the actual color material based on a remaining amount, which can be output, of each of the actual color materials.

7. The color conversion processing apparatus according to claim 6, wherein
　the conversion unit calculates a use amount of each of the actual color materials, which is expected for printing processing of the input image, and in a case where there is an actual color material whose remaining amount that can be output is short of the calculated use amount, converts the output value of the actual color material into an output value of one ore more other actual color materials capable of implementing substantially the same coloring as that of the actual color material whose remaining amount that can be output is short of the calculated use amount.

8. The color conversion processing apparatus according to claim 1, wherein the conversion unit determines the output values of the actual color materials in accordance with a second printing setting different from a first printing setting by combining output values of at least the two actual color materials specified in accordance with the first printing setting.

9. The color conversion processing apparatus according to claim 8, wherein
the conversion unit performs the combination by referring to a plurality of color conversion LUTs prepared in advance in accordance with a plurality of printing settings, and
the color conversion LUT is a LUT in which a signal value that the input image can take and the output value of the actual color material are associated with each other, and is created from a common virtual color material amount LUT specifying a correspondence relationship between the signal value of the input image and the output value of the virtual color material.

10. The color conversion processing apparatus according to claim 9, wherein
the conversion unit performs the combination so that a weight for each color conversion LUT becomes a positive value.

11. A color conversion processing method of converting a signal value of an input image into an output value of an actual color material used in an image forming apparatus, the method comprising the steps of:
acquiring a printing setting for the input image; and
converting the signal value of the input image into the output value of the actual color material in accordance with the acquired printing setting, wherein
at the conversion step, the conversion is performed while maintaining a relationship between the signal value of the input image and output values of a virtual color material,
the number of virtual color materials is smaller than the number of actual color materials and the respective virtual color materials have respective densities corresponding to respective wavelength bands obtained by dividing a wavelength range reproduced by the actual color materials being output into a plurality of wavelength bands,
the output values of the plurality of virtual color materials are determined based on the respective densities corresponding to the respective wavelength bands, and
the relationship is a relationship that increases monotonically and whose secondary differential does not become negative.

12. A non-transitory computer readable storage medium storing a program for causing a computer to perform a color conversion processing method of converting a signal value of an input image into an output value of an actual color material used in an image forming apparatus, the method comprising the steps of:
acquiring a printing setting for the input image; and
converting the signal value of the input image into the output value of the actual color material in accordance with the acquired printing setting, wherein
at the conversion step, the conversion is performed while maintaining a relationship between the signal value of the input image and output values of a virtual color material,
the number of virtual color materials is smaller than the number of actual color materials and the respective virtual color materials have respective densities corresponding to respective wavelength band obtained by dividing a wavelength range reproduced by the actual color materials being output into a plurality of wavelength bands,
the output values of the plurality of virtual color materials are determined based on the respective densities corresponding to the respective wavelength bands, and
the relationship is a relationship that increases monotonically and whose secondary differential does not become negative.

* * * * *